US012632978B2

(12) United States Patent
Lam et al.

(10) Patent No.: US 12,632,978 B2
(45) Date of Patent: May 19, 2026

(54) CONFIGURATION OF ROBOT OPERATIONAL ENVIRONMENT INCLUDING LAYOUT OF SENSORS

(71) Applicant: REALTIME ROBOTICS, INC., Boston, MA (US)

(72) Inventors: Jenni Lam, Boston, MA (US); Aakash Murugan, Boston, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 618 days.

(21) Appl. No.: 17/918,627

(22) PCT Filed: Apr. 12, 2021

(86) PCT No.: PCT/US2021/026818
§ 371 (c)(1),
(2) Date: Oct. 13, 2022

(87) PCT Pub. No.: WO2021/211420
PCT Pub. Date: Oct. 21, 2021

(65) Prior Publication Data
US 2023/0342967 A1 Oct. 26, 2023

Related U.S. Application Data

(60) Provisional application No. 63/009,583, filed on Apr. 14, 2020.

(51) Int. Cl.
*G06K 9/00* (2022.01)
*B25J 9/16* (2006.01)
(Continued)

(52) U.S. Cl.
CPC .............. *G06T 7/70* (2017.01); *B25J 9/1664* (2013.01); *B25J 9/1682* (2013.01); *B25J 9/1697* (2013.01);
(Continued)

(58) Field of Classification Search
CPC .. G06T 7/70; G06T 2207/30244; G06V 10/26
See application file for complete search history.

(56) References Cited

U.S. PATENT DOCUMENTS 4,163,183 A 7/1979 Dunne et al.
4,300,198 A 11/1981 Davini
(Continued)

FOREIGN PATENT DOCUMENTS

CA 3071332 A1 1/2019
CN 101837591 A 9/2010
(Continued)

OTHER PUBLICATIONS

Occlusion-Free Path Planning with a Probabilistic Roadmap, Matthew A. Baumann et al., IEEE, 2008, pp. 2151-2156 (Year: 2008).*
(Continued)

*Primary Examiner* — Jayesh A Patel
(74) *Attorney, Agent, or Firm* — Cozen O'Connor

(57) ABSTRACT

A layout of a robotic operational environment is optimized to at least reduce or minimize occlusion of one or more sensors, to improve computational efficiency of motion planning, and/or improve an efficiency and/or robustness of generated motions plans. A respective sensor pose (i.e., positioned and oriented) for one or more sensors may be determined while taking into account the various robot poses of the robot(s) and transitions between robot poses. For instance, cost values that represent occlusion may be determined, and candidate sensor poses evaluated based on cost values or aggregated cost. The total number of sensors to be employed may not be known before execution, and in fact may be determined only after several iterations, upon reaching a termination condition (e.g., task completion time). Sensors make take any variety of forms, e.g., digital camera, radar, LIDAR, sonar, passive infrared (PIR) motion detector.

23 Claims, 6 Drawing Sheets

(51) Int. Cl.
    *B25J 19/02*       (2006.01)
    *G06T 7/70*        (2017.01)
    *G06V 10/26*      (2022.01)

(52) U.S. Cl.
    CPC ............ *B25J 19/023* (2013.01); *G06V 10/26*
    (2022.01); *G06T 2207/30244* (2013.01)

(56) References Cited

U.S. PATENT DOCUMENTS

| | | | |
|---|---|---|---|
| 4,763,276 A | 8/1988 | Perreirra et al. | |
| 4,862,373 A | 8/1989 | Meng | |
| 4,890,241 A | 12/1989 | Hoffman et al. | |
| 4,949,277 A | 8/1990 | Trovato et al. | |
| 5,177,563 A | 1/1993 | Everett et al. | |
| 5,297,238 A | 3/1994 | Wang et al. | |
| 5,347,459 A | 9/1994 | Greenspan et al. | |
| 5,544,282 A | 8/1996 | Chen et al. | |
| 5,727,132 A | 3/1998 | Arimatsu et al. | |
| 6,004,016 A * | 12/1999 | Spector | B25J 9/1666 |
| | | | 700/255 |
| 6,049,756 A | 4/2000 | Libby | |
| 6,089,742 A | 7/2000 | Warmerdam et al. | |
| 6,259,988 B1 | 7/2001 | Galkowski et al. | |
| 6,345,213 B1 | 2/2002 | Graeser et al. | |
| 6,470,301 B1 | 10/2002 | Barral | |
| 6,493,607 B1 | 12/2002 | Bourne et al. | |
| 6,526,372 B1 | 2/2003 | Orschel et al. | |
| 6,526,373 B1 | 2/2003 | Barral | |
| 6,529,852 B2 | 3/2003 | Knoll et al. | |
| 6,539,294 B1 | 3/2003 | Kageyama | |
| 6,629,037 B1 | 9/2003 | Nyland | |
| 6,671,582 B1 | 12/2003 | Hanley | |
| 6,836,702 B1 | 12/2004 | Brogaardh et al. | |
| 6,907,133 B2 | 6/2005 | Gotoh | |
| 6,944,584 B1 | 9/2005 | Tenney et al. | |
| 7,493,231 B2 | 2/2009 | Graf | |
| 7,577,498 B2 | 8/2009 | Jennings et al. | |
| 7,609,020 B2 | 10/2009 | Kniss et al. | |
| 7,715,946 B2 | 5/2010 | Watanabe et al. | |
| 7,865,277 B1 | 1/2011 | Larson et al. | |
| 7,904,202 B2 | 3/2011 | Hoppe | |
| 7,940,023 B2 | 5/2011 | Kniss et al. | |
| 7,983,487 B2 * | 7/2011 | Agrawal | B22D 11/1265 |
| | | | 382/199 |
| 7,996,197 B1 | 8/2011 | Xavier | |
| 8,082,064 B2 | 12/2011 | Kay | |
| 8,103,085 B1 | 1/2012 | Zadeh | |
| 8,111,904 B2 | 2/2012 | Wallack et al. | |
| 8,162,584 B2 | 4/2012 | Michael et al. | |
| 8,315,738 B2 | 11/2012 | Chang et al. | |
| 8,571,706 B2 | 10/2013 | Zhang et al. | |
| 8,666,548 B2 | 3/2014 | Lim | |
| 8,825,207 B2 | 9/2014 | Kim et al. | |
| 8,825,208 B1 | 9/2014 | Benson | |
| 8,855,812 B2 | 10/2014 | Kapoor | |
| 8,880,216 B2 | 11/2014 | Izumi et al. | |
| 8,972,057 B1 | 3/2015 | Freeman et al. | |
| 8,989,897 B2 | 3/2015 | De Smet | |
| 9,061,421 B2 | 6/2015 | Trompeter | |
| 9,092,698 B2 | 7/2015 | Buehler et al. | |
| 9,102,055 B1 | 8/2015 | Konolige et al. | |
| 9,227,322 B2 | 1/2016 | Graca et al. | |
| 9,280,899 B2 | 3/2016 | Biess et al. | |
| 9,327,397 B1 | 5/2016 | Williams et al. | |
| 9,333,044 B2 | 5/2016 | Olson | |
| 9,434,072 B2 | 9/2016 | Buehler et al. | |
| 9,539,058 B2 | 1/2017 | Tsekos et al. | |
| 9,632,502 B1 | 4/2017 | Levinson et al. | |
| 9,645,577 B1 | 5/2017 | Frazzoli et al. | |
| 9,659,236 B2 | 5/2017 | Barker et al. | |
| 9,687,982 B1 | 6/2017 | Jules et al. | |
| 9,687,983 B1 | 6/2017 | Prats | |
| 9,701,015 B2 | 7/2017 | Buehler et al. | |
| 9,707,682 B1 | 7/2017 | Konolige et al. | |
| 9,731,724 B2 | 8/2017 | Yoon | |
| 9,981,382 B1 | 5/2018 | Strauss et al. | |
| 9,981,383 B1 | 5/2018 | Nagarajan | |
| 10,035,266 B1 | 7/2018 | Kroeger | |
| 10,099,372 B2 | 10/2018 | Vu et al. | |
| 10,124,488 B2 | 11/2018 | Lee et al. | |
| 10,131,053 B1 | 11/2018 | Sampedro et al. | |
| 10,296,012 B2 * | 5/2019 | Lalonde | G05D 1/0274 |
| 10,300,605 B2 | 5/2019 | Sato | |
| 10,303,180 B1 | 5/2019 | Prats | |
| 10,430,641 B2 | 10/2019 | Gao | |
| 10,671,081 B1 | 6/2020 | Prats | |
| 10,688,664 B2 | 6/2020 | Kovacs | |
| 10,705,528 B2 | 7/2020 | Wierzynski et al. | |
| 10,723,024 B2 | 7/2020 | Konidaris et al. | |
| 10,782,694 B2 | 9/2020 | Zhang et al. | |
| 10,792,114 B2 | 10/2020 | Hashimoto et al. | |
| 10,824,862 B2 * | 11/2020 | Qi | G06F 18/2414 |
| 10,959,795 B2 | 3/2021 | Hashimoto et al. | |
| 11,314,254 B2 | 4/2022 | Macias et al. | |
| 11,358,337 B2 | 6/2022 | Czinger et al. | |
| 11,407,117 B1 | 8/2022 | Hickman | |
| 11,623,494 B1 * | 4/2023 | Arnicar | G01S 17/931 |
| | | | 701/37 |
| 11,751,948 B2 | 9/2023 | Gregerson et al. | |
| 11,986,955 B2 * | 5/2024 | Agarwal | B25J 9/1697 |
| 2002/0013675 A1 | 1/2002 | Knoll et al. | |
| 2002/0074964 A1 | 6/2002 | Quaschner et al. | |
| 2003/0155881 A1 | 8/2003 | Hamann et al. | |
| 2004/0249509 A1 | 12/2004 | Rogers et al. | |
| 2005/0071048 A1 | 3/2005 | Watanabe et al. | |
| 2005/0216181 A1 | 9/2005 | Estkowski et al. | |
| 2006/0235610 A1 | 10/2006 | Ariyur et al. | |
| 2006/0241813 A1 | 10/2006 | Babu et al. | |
| 2006/0247852 A1 | 11/2006 | Kortge et al. | |
| 2007/0106422 A1 | 5/2007 | Jennings et al. | |
| 2007/0112700 A1 | 5/2007 | Den et al. | |
| 2007/0239315 A1 | 10/2007 | Sato et al. | |
| 2008/0002893 A1 * | 1/2008 | Vincent | G06V 20/63 |
| | | | 382/229 |
| 2008/0012517 A1 | 1/2008 | Kniss et al. | |
| 2008/0125893 A1 | 5/2008 | Tilove et al. | |
| 2008/0186312 A1 | 8/2008 | Ahn et al. | |
| 2008/0234864 A1 | 9/2008 | Sugiura et al. | |
| 2009/0055024 A1 | 2/2009 | Kay | |
| 2009/0192710 A1 | 7/2009 | Eidehall et al. | |
| 2009/0234499 A1 | 9/2009 | Nielsen et al. | |
| 2009/0295323 A1 | 12/2009 | Papiernik et al. | |
| 2009/0326711 A1 | 12/2009 | Chang et al. | |
| 2009/0326876 A1 | 12/2009 | Miller | |
| 2010/0145516 A1 | 6/2010 | Cedoz et al. | |
| 2010/0152899 A1 | 6/2010 | Chang et al. | |
| 2010/0235033 A1 | 9/2010 | Yamamoto et al. | |
| 2011/0036188 A1 | 2/2011 | Fujioka et al. | |
| 2011/0066282 A1 | 3/2011 | Bosscher et al. | |
| 2011/0153080 A1 | 6/2011 | Shapiro et al. | |
| 2011/0213497 A1 | 9/2011 | Nair | |
| 2011/0222995 A1 | 9/2011 | Irie et al. | |
| 2011/0264111 A1 | 10/2011 | Nowlin et al. | |
| 2012/0010772 A1 | 1/2012 | Pack et al. | |
| 2012/0053728 A1 | 3/2012 | Theodorus et al. | |
| 2012/0083964 A1 | 4/2012 | Montemerlo et al. | |
| 2012/0209428 A1 | 8/2012 | Mizutani | |
| 2012/0215351 A1 | 8/2012 | Mcgee et al. | |
| 2012/0297733 A1 | 11/2012 | Pierson et al. | |
| 2012/0323357 A1 | 12/2012 | Izumi et al. | |
| 2013/0076866 A1 | 3/2013 | Drinkard et al. | |
| 2013/0135315 A1 * | 5/2013 | Bares | G11B 27/031 |
| | | | 345/473 |
| 2013/0325244 A1 | 12/2013 | Wang et al. | |
| 2013/0346348 A1 | 12/2013 | Buehler et al. | |
| 2014/0012419 A1 | 1/2014 | Nakajima | |
| 2014/0025201 A1 | 1/2014 | Ryu et al. | |
| 2014/0025203 A1 | 1/2014 | Inazumi | |
| 2014/0058406 A1 | 2/2014 | Tsekos | |
| 2014/0067121 A1 | 3/2014 | Brooks et al. | |
| 2014/0079524 A1 | 3/2014 | Shimono et al. | |
| 2014/0121833 A1 | 5/2014 | Lee et al. | |
| 2014/0121837 A1 | 5/2014 | Hashiguchi et al. | |

(56) References Cited

U.S. PATENT DOCUMENTS

| | | | |
|---|---|---|---|
| 2014/0147240 A1 | 5/2014 | Noda et al. | |
| 2014/0156068 A1 | 6/2014 | Graca et al. | |
| 2014/0249741 A1 | 9/2014 | Levien et al. | |
| 2014/0251702 A1 | 9/2014 | Berger et al. | |
| 2014/0277718 A1 | 9/2014 | Izhikevich et al. | |
| 2014/0305227 A1 | 10/2014 | Johns | |
| 2014/0309916 A1 | 10/2014 | Bushnell | |
| 2014/0368504 A1 | 12/2014 | Chen et al. | |
| 2015/0005785 A1 | 1/2015 | Olson | |
| 2015/0037131 A1 | 2/2015 | Girtman et al. | |
| 2015/0051783 A1 | 2/2015 | Tamir et al. | |
| 2015/0134111 A1 | 5/2015 | Nakajima | |
| 2015/0217455 A1* | 8/2015 | Kikkeri | G06T 7/0004 |
| | | | 700/259 |
| 2015/0261899 A1 | 9/2015 | Atohira et al. | |
| 2015/0266182 A1 | 9/2015 | Strandberg | |
| 2016/0001775 A1 | 1/2016 | Wilhelm et al. | |
| 2016/0008078 A1 | 1/2016 | Azizian et al. | |
| 2016/0016312 A1 | 1/2016 | Lawrence et al. | |
| 2016/0059412 A1 | 3/2016 | Oleynik | |
| 2016/0107313 A1 | 4/2016 | Hoffmann et al. | |
| 2016/0112694 A1 | 4/2016 | Nishi et al. | |
| 2016/0121486 A1 | 5/2016 | Lipinski et al. | |
| 2016/0121487 A1 | 5/2016 | Mohan et al. | |
| 2016/0154408 A1 | 6/2016 | Eade et al. | |
| 2016/0161257 A1 | 6/2016 | Simpson et al. | |
| 2016/0299507 A1 | 10/2016 | Shah et al. | |
| 2016/0324587 A1 | 11/2016 | Olson | |
| 2016/0357187 A1 | 12/2016 | Ansari | |
| 2017/0001775 A1 | 1/2017 | Cimmerer et al. | |
| 2017/0004406 A1 | 1/2017 | Aghamohammadi | |
| 2017/0028559 A1 | 2/2017 | Davidi et al. | |
| 2017/0097631 A1 | 4/2017 | Linnell et al. | |
| 2017/0120448 A1 | 5/2017 | Lee et al. | |
| 2017/0123419 A1 | 5/2017 | Levinson et al. | |
| 2017/0132334 A1 | 5/2017 | Levinson et al. | |
| 2017/0146999 A1 | 5/2017 | Cherepinsky et al. | |
| 2017/0157769 A1 | 6/2017 | Aghamohammadi et al. | |
| 2017/0168485 A1 | 6/2017 | Berntorp et al. | |
| 2017/0168488 A1 | 6/2017 | Wierzynski et al. | |
| 2017/0193830 A1 | 7/2017 | Fragoso et al. | |
| 2017/0210008 A1 | 7/2017 | Maeda | |
| 2017/0219353 A1 | 8/2017 | Alesiani | |
| 2017/0252922 A1 | 9/2017 | Levine et al. | |
| 2017/0252924 A1* | 9/2017 | Vijayanarasimhan | B25J 9/163 |
| 2017/0305015 A1 | 10/2017 | Krasny et al. | |
| 2017/0315530 A1 | 11/2017 | Godau et al. | |
| 2018/0001472 A1* | 1/2018 | Konidaris | B25J 9/1666 |
| 2018/0001476 A1 | 1/2018 | Tan et al. | |
| 2018/0029231 A1 | 2/2018 | Davis | |
| 2018/0029233 A1 | 2/2018 | Lager | |
| 2018/0032039 A1 | 2/2018 | Huynh et al. | |
| 2018/0074505 A1* | 3/2018 | Lv | B60W 60/00272 |
| 2018/0113468 A1 | 4/2018 | Russell | |
| 2018/0136662 A1 | 5/2018 | Kim | |
| 2018/0150077 A1 | 5/2018 | Danielson et al. | |
| 2018/0172450 A1 | 6/2018 | Lalonde et al. | |
| 2018/0173242 A1 | 6/2018 | Lalonde et al. | |
| 2018/0189683 A1 | 7/2018 | Newman | |
| 2018/0222050 A1 | 8/2018 | Vu et al. | |
| 2018/0222051 A1 | 8/2018 | Vu et al. | |
| 2018/0222052 A1 | 8/2018 | Vu et al. | |
| 2018/0229368 A1 | 8/2018 | Leitner et al. | |
| 2018/0250818 A1 | 9/2018 | Maeda | |
| 2018/0281786 A1 | 10/2018 | Oyaizu et al. | |
| 2018/0338804 A1 | 11/2018 | Azizian et al. | |
| 2018/0339456 A1 | 11/2018 | Czinger et al. | |
| 2018/0342088 A1* | 11/2018 | Richter | G06T 11/006 |
| 2018/0349702 A1 | 12/2018 | Gildert et al. | |
| 2019/0015981 A1 | 1/2019 | Yabushita et al. | |
| 2019/0039242 A1 | 2/2019 | Fujii et al. | |
| 2019/0049566 A1* | 2/2019 | Adams | G01C 25/00 |
| 2019/0087976 A1 | 3/2019 | Sugahara et al. | |
| 2019/0101930 A1 | 4/2019 | Yadmellat | |
| 2019/0105779 A1 | 4/2019 | Einav | |

| | | | |
|---|---|---|---|
| 2019/0143518 A1 | 5/2019 | Maeda | |
| 2019/0163191 A1 | 5/2019 | Sorin et al. | |
| 2019/0164430 A1 | 5/2019 | Nix | |
| 2019/0196480 A1 | 6/2019 | Taylor | |
| 2019/0216555 A1* | 7/2019 | DiMaio | A61B 90/50 |
| 2019/0232496 A1 | 8/2019 | Graichen et al. | |
| 2019/0234751 A1 | 8/2019 | Takhirov | |
| 2019/0240835 A1* | 8/2019 | Sorin | G05D 1/0214 |
| 2019/0262993 A1 | 8/2019 | Cole et al. | |
| 2019/0291277 A1 | 9/2019 | Oleynik | |
| 2019/0293443 A1 | 9/2019 | Kelly et al. | |
| 2019/0380794 A1* | 12/2019 | Al Jewad | A61B 34/20 |
| 2019/0391597 A1* | 12/2019 | Dupuis | B25J 9/0084 |
| 2020/0030971 A1 | 1/2020 | Oleynik | |
| 2020/0069134 A1 | 3/2020 | Ebrahimi Afrouzi et al. | |
| 2020/0078097 A1 | 3/2020 | Gregerson et al. | |
| 2020/0097014 A1* | 3/2020 | Wang | G06Q 10/047 |
| 2020/0198140 A1 | 6/2020 | Dupuis et al. | |
| 2020/0215686 A1 | 7/2020 | Vijayanarasimhan et al. | |
| 2020/0331146 A1 | 10/2020 | Vu et al. | |
| 2020/0331155 A1 | 10/2020 | Vu et al. | |
| 2020/0338730 A1 | 10/2020 | Yamauchi et al. | |
| 2020/0338733 A1 | 10/2020 | Dupuis et al. | |
| 2020/0353917 A1 | 11/2020 | Leitermann et al. | |
| 2020/0368910 A1* | 11/2020 | Chu | G05B 19/0421 |
| 2020/0398428 A1 | 12/2020 | Murray et al. | |
| 2021/0009351 A1 | 1/2021 | Beinhofer et al. | |
| 2021/0178591 A1 | 6/2021 | Floyd-Jones et al. | |
| 2021/0205992 A1 | 7/2021 | Pandya et al. | |
| 2022/0080582 A1 | 3/2022 | Sekimoto | |
| 2022/0088780 A1 | 3/2022 | Abdul-Hadi et al. | |
| 2022/0305648 A1 | 9/2022 | Oleynik | |
| 2022/0339875 A1 | 10/2022 | Czinger et al. | |
| 2022/0355483 A1 | 11/2022 | Lee et al. | |
| 2023/0031545 A1 | 2/2023 | Oleynik | |
| 2023/0061855 A1 | 3/2023 | Lin et al. | |
| 2023/0063205 A1 | 3/2023 | Nerkar | |
| 2023/0190396 A1 | 6/2023 | Taheri et al. | |
| 2023/0363833 A1 | 11/2023 | Gregerson et al. | |

FOREIGN PATENT DOCUMENTS

| | | | |
|---|---|---|---|
| CN | 102814813 A | 12/2012 | |
| CN | 103722565 A | 4/2014 | |
| CN | 103955221 A | 7/2014 | |
| CN | 104407616 A | 3/2015 | |
| CN | 104858876 A | 8/2015 | |
| CN | 105069530 A | 11/2015 | |
| CN | 102186638 B | 3/2016 | |
| CN | 106660208 A | 5/2017 | |
| CN | 107073710 A | 8/2017 | |
| CN | 107206592 A | 9/2017 | |
| CN | 107234634 A | 10/2017 | |
| CN | 107486858 A | 12/2017 | |
| CN | 107617877 A | 1/2018 | |
| CN | 108297059 A | 7/2018 | |
| CN | 108453702 A | 8/2018 | |
| CN | 108789416 A | 11/2018 | |
| CN | 108789500 A | 11/2018 | |
| CN | 108858183 A | 11/2018 | |
| CN | 108942920 A | 12/2018 | |
| CN | 109521763 A | 3/2019 | |
| CN | 109782763 B | 11/2021 | |
| CN | 114073585 A | 2/2022 | |
| DE | 102012103830 A1 | 11/2012 | |
| EP | 1241628 A2 | 9/2002 | |
| EP | 1901150 A1 | 3/2008 | |
| EP | 2306153 A2 | 4/2011 | |
| EP | 3250347 A1 | 12/2017 | |
| EP | 3266570 A1 | 1/2018 | |
| EP | 3486612 A1 | 5/2019 | |
| EP | 3725472 A1 | 10/2020 | |
| JP | 07100755 | 4/1995 | |
| JP | 1997212229 | 8/1997 | |
| JP | 10512413 A | 11/1998 | |
| JP | 1148177 | 2/1999 | |
| JP | 11296229 A | 10/1999 | |
| JP | 2001166806 A | 6/2001 | |
| JP | 2002073130 A | 3/2002 | |

(56) References Cited

FOREIGN PATENT DOCUMENTS

| JP | 2002116817 A | 4/2002 | |
| JP | 2003127077 A | 5/2003 | |
| JP | 2005022062 A | 1/2005 | |
| JP | 2005032196 A | 2/2005 | |
| JP | 2006224740 A | 8/2006 | |
| JP | 2007257274 A | 10/2007 | |
| JP | 2007283450 A | 11/2007 | |
| JP | 2007531110 A | 11/2007 | |
| JP | 2008502488 A | 1/2008 | |
| JP | 2008065755 A | 3/2008 | |
| JP | 2008134165 A | 6/2008 | |
| JP | 2010061293 A | 3/2010 | |
| JP | 2010201592 A | 9/2010 | |
| JP | 2010210592 A | 9/2010 | |
| JP | 2011075382 A | 4/2011 | |
| JP | 2011249711 A | 12/2011 | |
| JP | 2012056023 A | 3/2012 | |
| JP | 2012190405 A | 10/2012 | |
| JP | 2012243029 A | 12/2012 | |
| JP | 2013193194 A | 9/2013 | |
| JP | 2014184498 A | 10/2014 | |
| JP | 2015044274 A | 3/2015 | |
| JP | 2015517142 A | 6/2015 | |
| JP | 2015208811 A | 11/2015 | |
| JP | 2016099257 A | 5/2016 | |
| JP | 2016190315 A | 11/2016 | |
| JP | 2016209969 A | 12/2016 | |
| JP | 2017080845 A | 5/2017 | |
| JP | 2017131973 A | 8/2017 | |
| JP | 2017136677 A | 8/2017 | |
| JP | 2017148908 A | 8/2017 | |
| JP | 2018505788 A | 3/2018 | |
| JP | 2018130793 A | 8/2018 | |
| JP | 2018134703 A | 8/2018 | |
| JP | 2018144158 A | 9/2018 | |
| JP | 2018144166 A | 9/2018 | |
| JP | 2019136848 A | 8/2019 | |
| JP | 2019188530 A | 10/2019 | |
| JP | 2019219734 A | 12/2019 | |
| JP | 2020049554 A | 4/2020 | |
| JP | 2020049623 A | 4/2020 | |
| JP | 2020082332 A | 6/2020 | |
| JP | 2020110885 A | 7/2020 | |
| KR | 19980024584 A | 7/1998 | |
| KR | 20110026776 A | 3/2011 | |
| KR | 20130112507 A | 10/2013 | |
| KR | 20150126482 A | 11/2015 | |
| KR | 20170018564 A | 2/2017 | |
| KR | 20170044987 A | 4/2017 | |
| KR | 20170050166 A | 5/2017 | |
| KR | 20180125646 A | 11/2018 | |
| TW | 201318793 A | 5/2013 | |
| TW | 615691 | 2/2018 | |
| TW | 653130 | 3/2019 | |
| WO | 9924914 A1 | 5/1999 | |
| WO | 2011096327 A1 | 8/2011 | |
| WO | 2015113203 A1 | 8/2015 | |
| WO | 2016122840 A1 | 8/2016 | |
| WO | 2017168187 A1 | 10/2017 | |
| WO | 2017214581 A1 | 12/2017 | |
| WO | 2018043525 A1 | 3/2018 | |
| WO | 2018148181 A1 | 8/2018 | |
| WO | WO-2019183141 A1 * | 9/2019 | .............. B25J 17/02 |
| WO | 2020040979 A1 | 2/2020 | |
| WO | 2020117958 A1 | 6/2020 | |

OTHER PUBLICATIONS

View planning for exploration—sensors, Pengpeng Wang et al., Advanced Robotics, 2007, pp. 771-792 (Year: 2007).*

A General Method for Sensor Planning in Multi-Sensor Systems: Extension to Random Occlusion, Anurag Mittal et al., IJCV, 2008, pp. 31-52 (Year: 2008).*

Can You See Me Now? Sensor Positioning for Automated and Persistent Surveillance, Yi Yao et al., IEEE, 2010, pp. 101-115 (Year: 2010).*

Operation of an Intelligent Space with Heterogeneous Sensors, Doojin Kim, Aug. 2014, pp. i-135 (Year: 2014).*

Dynamic Reconfiguration in Camera Networks:A Short Survey, Claudio Piciarelli et al., IEEE, 2016, pp. 965-977 (Year: 2016).*

Computing Occlusion-Free Viewpoints, Konstantinos Tarabanis et al., IEEE, 1996, pp. 279-292 (Year: 1996).*

Tracking Targets Using Multiple Robots: The Effect of Environment Occlusion, Boyoon Jung et al., Autonomous Robots, 2002, pp. 191-205 (Year: 2002).*

Sensor Planning for 3D Object Search, Yiming Ye, Ideal., 1999, pp. 145-168 (Year: 1999).*

Visual Motion Planning for Mobile Robots, Hong Zhang et al., IEEE, 2002, pp. 199-208 (Year: 2002).*

Real-Time Visual Tracking of 3-D Objects with Dynamic Handling of Occlusion, P. Wunsch et al., IEEE, 1997, pp. 2868-2873 (Year: 1997).*

Vision for robotic object manipulation in domestic settings, Danica Kragic et al., Elsevier, 2005, pp. 85-100 (Year: 2005).*

Object Placement Estimation with Occlusions and Planning of Robotic Handling Strategies, Wataru Miyazaki et al., IEEE, 2017, pp. 602-607 (Year: 2017).*

Communication Pursuant to Article 94(3) EPC, dated Jul. 12, 2023, for European Application No. 19 893 874.8-1205, 5 pages.

Final Office Action for U.S. Appl. No. 17/682,732, mailed Jul. 7, 2023, 46 pages.

First Office Action issued in Chinese No. 201980055188.0 with English translation, Mailed Date: Jul. 1, 2023, 16 pages.

First Office Action issued in Chinese No. 201980080759.6 with English translation, Mailed Date: Jun. 28, 2023, 4 pages.

First Office Action issued in Chinese No. 202080055382.1 with English translation, Mailed Date: Jun. 28, 2023, 30 pages.

International Search Report and Written Opinion for PCT/US2023/064012, mailed Jul. 10, 2023, 15 pages.

Notice of Reasons for Rejection dated Feb. 16, 2023, for Japanese Application No. 2021-571340, 10 pages.

Office Action issued in Taiwan Application No. 108104094, mailed Feb. 6, 2023, 24 pages.

Communication Pursuant to Article 94(3) EPC, dated Apr. 30, 2024, for European Application No. 19851097.6-1201, 9 pages.

Hassan, Mahdi et al., "An Approach to Base Placement for Effective Collaboration of Multiple Autonomous Industrial Robots", 2015 IEEE International Conference on Robotics and Automation (ICRA), pp. 3286-3291.

Japanese Notice of Allowance for Application No. 2022-544106, mailed Apr. 30, 2024, 3 pages.

Lim, Zhen Yang et al., "Multi-objective hybrid algorithms for layout optimization in multi-robot cellular manufacturing systems", Knowledge-Based Systems, vol. 120, pp. 87-98.

Christian Frese et al : "Workspace monitoring and planning for safe mobile manipulaiton", arxiv. org, Cornell University Library, 201 Olin Library Cornell University Ithaca, NY 14853, Jun. 2, 2020 (Jun. 2, 2020), XP081690333. arXiv.2006.01546v1.

EP Search Report mailed Aug. 22, 2024, in EP App. No. 21887233.1-1201/ 4196323 PCT/US2021056317 , 14 pages.

Magrini Emanuele et al: "Human-robot coexistence and interaction in open industrial cells", Robotics and Computer Integrated Manufacturing, Elsevier Science Publishers BV. Barking, GB, vol. 61, Aug. 5, 2019 (Aug. 5, 2019), xp08588002, ISSN: 0736-5845.

Non Final Office Action for U.S. Appl. No. 17/909,801, mailed Jul. 30, 2024, 18 pages.

Notice of Allowance for U.S. Appl. No. 18/221,027, mailed Jul. 1, 2024, 10 pages.

Notice of Allowance for U.S. Appl. No. 18/222,801, mailed Jul. 3, 2024, 9 pages.

Notice of Reasons for Refusal. Japanese Application No. 2023-532462, dated Jun. 21, 2024, 25 pages.

Non-Final Office Action Issued in U.S. Appl. No. 18/221,027, mailed Feb. 29, 2024, 13 pages.

Non-Final Office Action Issued in U.S. Appl. No. 18/222,801, mailed Feb. 15, 2024, 44 pages.

(56)　　　　References Cited

OTHER PUBLICATIONS

Notice of Reasons for Refusal. Japanese Application No. 2023-524134, dated Mar. 12, 2024, 6 pages.
Final Office Action Issued in U.S. Appl. No. 17/270,597, mailed Oct. 27, 2023, 29 pages.
Japanese Decision of Registration for JP 2022-054900, mailed Jan. 9, 2024, 3 pages.
Non-Final Office Action Issued in U.S. Appl. No. 17/604,285, mailed Nov. 21, 2023, 28 pages.
Notice of Reasons for Refusal dated Nov. 27, 2023, for Japanese Application No. 2021-561986, 10 pages.
Notice of Reasons for Refusal for Japanese Patent Application No. 2022-562247, mailed Sep. 25, 2023, 7 pages.
Notice of Reasons for Refusal. Japanese Application No. 2022-556467, dated Sep. 28, 2023, 10 pages.
Oleynikova, et al., "Singed Distance Fields: A Natural Representation for Both Mapping and Planning", 2016, 7 pages.
Taiwanese First Office Action—Application No. 109120779 dated Nov. 9, 2023, 11 pages.
Christian Potthast et al: "Seeing with your hands: A Better way to obtain perception capablities with a personal robot", Advance Robotics and Its Social Impacts, Oct. 2, 2011, pp. 50-53. xp032235164.
Efrain Lopez-Damian et al: "Probabilistic view planner for 3D modelling indoor environments", Intelligent Robots and Systems, 2009. Oct. 10, 2009, pp. 4021-4026, xp031580735.
EP Search Report mailed Sep. 1, 2023, EP App No. 21789270.2-1205 /4135940 PCT/US2021026818—23 pages.
Final Office Action for U.S. Appl. No. 17/506,364, mailed Aug. 25, 2023, 55 pages.
Kececi F et al:"Improving Visually Servoed Disassembly Operations By Automatic Camera Placement", Proceedings of The 1998 IEEE International Conference On Robotics and Automation. ICRA '98. May 16-20, 1998; New York, NY : IEEE, US ,XP000784527.
Non-Final Office Action Issued in U.S. Appl. No. 17/270,597, mailed Aug. 18, 2023, 25 pages.
Notice of Reasons for Refusal for Japanese Patent Application No. 2021-571340, mailed Aug. 8, 2023, 8 pages.
Office Action, ROC (Taiwan) Pat. Appln. No. 108130161 and Search Report—APP.108130161—mailed Sep. 19, 2023.
Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.
Bharathi Akilan et al: "Feedrate optimization for smooth minimum-time trajectory generation with higher order constraints", The International Journal of Advanced Manufacturing Technology,vol. 82, No. 5, Jun. 28, 2015 (Jun. 28, 2015), pp. 1029-1040.
Communication Pursuant to Article 94(3) EPC, issued in European Application No. 17811131.6, Mailed Date: Jun. 16, 2020, 5 pages.
Communication Pursuant to Article 94(3) EPC, issued in European Application No. 18209405.2, Mailed Date: Nov. 23, 2020, 4 pages.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
European Search Report dated Jul. 23, 2021, for European Application No. 19851097.6, 15 pages.
European Search Report issued in European Application No. 19771537.8, Mailed Date: Mar. 29, 2021, 8 pages.
European Search Report, Mailed Date: Nov. 17, 2020 for EP Application No. 16743821.7, 4 pages.
Extended EP Search Report mailed Jul. 18, 2022 EP App No. 20832308.9-1205, 10 pages.
Extended EP Search Report mailed Jul. 25, 2022 EP App No. 20857383.2-1205, 10 pages.
Extended EP Search Report mailed Nov. 7, 2022, EP App No. 21744840.6-1205, 14 pages.
Extended European Search Report issued in European Application No. 17811131.6, Mailed Date: Apr. 24, 2019, 16 pages.

Extended European Search Report issued in European Application No. 18209405.2, Mailed Date: Aug. 2, 2019, 9 pages.
Extended European Search Report issued in European Application No. 19893874.8, Mailed Date: Jan. 5, 2022, 13 pages.
Extended European Search Report mailed Jul. 18, 2022 in EP App No. 20832308.9.
Extended European Search Report, Mailed Date: Apr. 10, 2018 for EP Application No. 16743821.7, in 9 pages.
Final Office Action Issued in U.S. Appl. No. 16/268,290, Mailed Date: Apr. 21, 2021, 58 pages.
Final Office Action mailed Aug. 2, 2021 for U.S. Appl. No. 16/240,086 in 66 pages.
Final Office Action mailed Sep. 7, 2022, for U.S. Appl. No. 16/909,096, 54 pages.
First Office Action issued in Chinese No. 201680006941.3 with English translation, Mailed Date: Sep. 29, 2019, 16 pages.
First Office Action issued in Japanese Patent Application No. 2017-557268, Mailed Date: Aug. 7, 2018, 15 pages.
Gasparetto A et al: "Experimental validation and comparative analysis of optimal time-jerk algorithms for trajectory planning", Robotics and Computer Integrated Manufacturing, Elsevier Science Publishers BV. , Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Hassan, "Modeling and Stochastic Optimization of Complete Coverage under Uncertainties in Multi-Robot Base Placements," 2016, Intelligent Robots and Systems (IROS) (Year: 2016).
Hassan, et al., "An Approach to Base Placement for Effective Collaboration of Multiple Autonomous Industrial Robots," 2015 IEEE International Conference on Robotics and Automation (ICRA), pp. 3286-3291 (Year: 2015).
Hassan, et al., "Simultaneous area partitioning and allocation for complete coverage by multiple autonomous industrial robots," 2017, Autonomous Robots 41, pp. 1609-1628 (Year: 2017).
Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.
International Search Report and Written Opinion for PCT/US2019/016700, Mailed Date: May 20, 2019, 14 pages.
International Search Report and Written Opinion for PCT/US2019/023031, Mailed Date: Aug. 14, 2019 in 19 pages.
International Search Report and Written Opinion for PCT/US2019/064511, Mailed Date: Mar. 27, 2020, 10 pages.
International Search Report and Written Opinion for PCT/US2021/061427, mailed Apr. 29, 2022, 14 pages.
International Search Report and Written Opinion issued in PCT Application No. PCT/2020/034551, Mailed Date: Aug. 31, 2020, 18 pages.
International Search Report and Written Opinion issued in PCT Application No. PCT/US2016/012204; Mailed Date: Mar. 21, 2016, 10 pages.
International Search Report and Written Opinion issued in PCT Application No. PCT/US2017/036880; Mailed Date: Oct. 10, 2017, 15 pages.
International Search Report and Written Opinion issued in PCT Application No. PCT/US2019/045270; Mailed Date: Nov. 25, 2019, 11 pages.
International Search Report and Written Opinion issued in PCT/US2019/012209, Mailed Date: Apr. 25, 2019, 24 pages.
International Search Report and Written Opinion, mailed Apr. 22, 2021, for International Application No. PCT/US2021/013610, 9 pages.
International Search Report and Written Opinion, Mailed Date: Jul. 29, 2020, in PCT/US2020/028343, 11 pages.
Atay, Nuzhet , et al., "A Motion Planning Processor on Reconfigurable Hardware", All Computer Science and Engineering Research, Computer Science and Engineering; Report No. WUCSE-2005-46; Sep. 23, 2005.

(56) References Cited

OTHER PUBLICATIONS

Hauck, Scott , et al., "Configuration Compression for the Xilinx XC6200 FPGA", IEEE Transactions on Computer-Aided Design of Integrated Circuits and Systems, vol. 18, No. 8; Aug. 1999.

Kavraki, L.E. , et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.

Murray, Sean , et al., "The microarchitecture of a real-time robot motion planning accelerator", 2016 49th Annual IEEE/ACM International Symposium on Microarchitecture (Micro), IEEE, Oct. 15, 2016, 12 pages.

Pan, Jia , et al., Efficient Configuration Space Construction and Optimization for Motion Planning, 2015, Research Robotics, Whole Document, 12 pages.

Pobil, Angel P, et al., "A New Representation for Collision Avoidance and Detection", Proceedings of the 1992 IEEE, XP000300485, pp. 246-251.

Sato, Yuichi , et al., "Efficient Collision Detection using Fast Distance-Calculation Algorithms for Convex and Non-Convex Objects", Proceeding of the 1996 IEEE, XP-000750294, 8 pages.

Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.

Extended EP Search Report mailed Jan. 29, 2024, EP App No. 21772200.8-1205, 9 pages.

Office Action issued in Taiwan Application No. 109113033, mailed Jan. 19, 2024, 10 pages.

Office Action issued in Taiwan Application No. 109118558, mailed Jan. 4, 2024, 8 pages.

Extended EP Search Report mailed May 10, 2023, EP App No. 20818760.9-1012, 9 pages.

First Office Action and Search Report issued in Chinese No. 202080040382.4 with English translation, Mailed Date: May 26, 2023, 15 pages.

First Office Action issued in Chinese No. 202080059714.3 with English translation, Mailed Date: May 24, 2023, 24 pages.

Japanese Office Action, Japanese Application No. 2021-576425, Mar. 13, 2023, 14 pages.

Li, et al., "A Novel Cost Function for Decision-Making Strategies in Automotive Collision Avoidance Systems", 2018 IEEE, ICVES, 8 pages.

Non-Final Office Action Issued in U.S. Appl. No. 17/506,364, Mailed Apr. 28, 2023, 50 pages.

Schwesinger, "Motion Planning n Dynamic Environments with Application to Self-Driving Vehicles", Dr. Andreas Krause, Jan. 1, 2017, XP093029842.

Notice of Allowance, Japanese Application No. 2023-532462, dated Oct. 29, 2024, 3 pages.

First Office Action issued in Chinese No. 201980024188.4 with English translation, Mailed Date: Feb. 22, 2023, 28 pages.

Non-Final Office Action Issued in U.S. Appl. No. 16/981,467, Mailed Mar. 16, 2023, 19 Pages.

Notice of Reasons for Rejection dated Feb. 7, 2023, for Japanese Application No. 2022-054900, 7 pages.

Office Action issued in Taiwan Application No. 108104094, malled Feb. 6, 2023, 24 pages.

International Search Report and Written Opinion, Mailed Date: Nov. 23, 2020, for PCT/US2020/047429, 11 Pages.

International Search Report and Written Opinion, Mailed Date: Sep. 29, 2020 for PCT/US2020/039193, 9 pages.

Corrales, J.A. , et al., Safe Human-robot interaction based on dynamic sphere-swept line bounding volumes, Robotic and Computer-Integrated Manufacturing 27 (2011) 177-185, 9 page.

Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.

Kalawoun, "Motion planning of multi-robot system for airplane stripping." 2019, Universite Clermont Auvergne (Year: 2019).

Kapanoglu, et al., "A pattern-based genetic algorithm for multi-robot coverage path planning minimizing completion time," 2012, Journal of Intelligent Manufacturing 23, pp. 1035-1045 (Year: 2012).

Klampfl Erica et al: "Optimization of workcell layouts in a mixed-model assembly line environment" , International Journal of Flexible Manufacturing Systems, Kluwer Academic Publishers, Boston, vol. 17, No. 4, 23 pages., Oct. 10, 2006.

Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.

Long Tao et al: "Optimization on multi-robot workcell layout in vertical plane", Information and Automation (ICIA), 2011 IEEE International Conference on, IEEE, Jun. 6, 2011, 6 pages.

Murray et al., "Robot Motion Planning on a Chip", Robotics: Science and Systems, Jan. 1, 2016, 9 pages.

Non Final Office Action for U.S. Appl. No. 16/883,376, mailed Sep. 27, 2022, 26 pages.

Non-Final Office Action Issued in U.S. Appl. No. 16/240,086, Mailed Date: Feb. 11, 2021, 79 pages.

Non-Final Office Action Issued in U.S. Appl. No. 16/268,290, Mailed Date: Jan. 27, 2021, 54 pages.

Non-Final Office Action Issued in U.S. Appl. No. 16/268,290, Mailed Date: Jun. 17, 2021, 35 pages.

Non-Final Office Action Issued in U.S. Appl. No. 16/308,693, Mailed Date: Dec. 11, 2020, 17 pages,.

Non-Final Office Action Issued in U.S. Appl. No. 16/308,693, Mailed Date: Jun. 1, 2020, 16 pages.

Non-Final Office Action Issued in U.S. Appl. No. 15/546,441, Mailed Sep. 17, 2019, 58 Pages.

Non-Final Office Action Issued in U.S. Appl. No. 16/308,693, Mailed May 14, 2021, 16 pages.

Non-Final Office Action Issued in U.S. Appl. No. 16/909,096 Mailed May 6, 2022, 49 pages.

Non-Final Office Action mailed Sep. 14, 2022, for U.S. Appl. No. 16/999,339, 18 pages.

Notice of Allowance for U.S. Appl. No. 17/153,662, mailed Dec. 6, 2022, 15 pages.

Notice of Allowance mailed Sep. 23, 2021, for Ritchey, "Motion Planning for Autonomous Vehicles and Reconfigurable Motion Planning Processors," U.S. Appl. No. 16/615,493, 11 pages.

Notice of Allowance mailed Dec. 24, 2021, for Sorin, "Apparatus, Method and Article to Facilitate Motion Planning of an Autonomous Vehicle in an Environment Having Dynamic Objects," U.S. Appl. No. 16/240,086, 28 pages.

Notice of Allowance malled Jan. 25, 2022, for Sorin, "Motion Planning for Autonomous Vehicles and Reconfigurable Motion Planning Processors ," U.S. Appl. No. 16/308,693, 18 pages.

Notice of Allowance mailed Sep. 24, 2021, for Ritchey, "Motion Planning of a Robot Storing a Discretized Environment on One or More Processors and Improved Operation of Same," U.S. Appl. No. 16/268,290, 8 pages.

Notice of Reasons for Rejection, issued in corresponding Japanese Application No. 2021-509212, dated Apr. 7, 2022, 6 pages (English Translation).

Notification of Transmittal of International Search Report and Written Opinion for International Application No. PCT/US2021/056317, mailed Feb. 11, 2022, 13 pages.

Office Action Issued in Japanese Application No. 2018-564836, Mailed Date: Dec. 3, 2019, 3 Pages.

Office Action Issued in Japanese Application No. 2018-564836, Mailed Date: May 19, 2020, 5 Pages.

Office Action Issued in Japanese Application No. 2021-171704, Mailed Date: Jan. 28, 2022, 3 Pages.

Office Action Issued in Japanese Application No. 2021-171726, Mailed Date: Jan. 26, 2022, 4 Pages.

Or.pdf (Or | Definition of Or by Merriam-Webster, Sep. 9, 2019, https://www.merriam-webster.com/dictionary/or, pp. 1-12; Year: 2019.

Pashkevich AP et al: "Multiobjective optimisation of robot location in a workcell using genetic algorithms", Control '98. UKACC

(56)         References Cited

OTHER PUBLICATIONS

International Conference on (Conf. Publ. No. 455) Swansea, UK Sep. 1-4, 1998, London, UK, vol. 1, Sep. 1, 1998, 6 pages.
Pires, et al., "Robot Trajectory Planning Using Multi-objective Genetic Algorithm Optimization," 2004, Genetic and Evolutionary Computation—GECCO 2004, pp. 615-626 (Year: 2004).
Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
Rodriguez et al., "Planning manipulation movements of a dual-arm system considering obstacle removing". Robotics and Autonomous Systems, Elsevier Science Publishers, vol. 62, No. 12, pp. 1816-1826; Aug. 1, 2014.
S. Saravana Perumaal et al: "Automated Trajectory Planner of Industrial Robot for Pick-and-Place Task", International Journal of Advanced Robotic Systems, vol. 10, No. 2, Jan. 1, 2013.
Second Office Action issued in Japanese Patent Application No. 2017-557268, Mailed Date: Feb. 26, 2019, 5 pages.
Sicilliano et al. "Robotics. Modelling, Planning and Control", Chapter 12: Motion Planning, pp. 523-559, 2009.
Sonja Macfarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Taiwanese First Office Action—Application No. 106119452 dated Jun. 18, 2021, 25 pages.
Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.
Chen, Chao , Motion Planning for Nonholonomic Vehicles with Space Exploration Guided Heuristic Search, 2016, IEEE.com, Whole Document, 140 pages.
Johnson, David E., et al., "Bound Coherence for Minimum Distance Computations", Proceedings of the 1999 IEEE International Conference on Robotics and Automation, May 1999.
2nd Examination Report mailed Apr. 3, 2025 in EP App No. 20832308.9, 12 pages.

Communication Pursuant to Article 94(3) EPC issued in European Application No. 21772200.8-1201 dated Apr. 8, 20025, 6 pages.
Holger Taubig et al: "Real-time swept volume and distance computation for self collision detection", Intelligent Robots and Systems (IROS), 2011 IEEE/RSJ International Conference on, IEEE, Sep. 25, 2011, pp. 1585-1592.
Non Final Office Action for U.S. Appl. No. 18/039,814, mailed Mar. 3, 2025, 42 pages.
Notice of Reasons for Refusal for Japanese Patent Application No. 2024-065096, mailed Mar. 21, 2025, 8 pages.
Chinese Office Action dated Apr. 30, 2025 for Chinese Application No. 202180028405.4 in 20 pages.
EP Search Report mailed Jun. 2, 2025 in App.No. 23767682.0-1201 / 4489947 PCT/US2023064012, 13 pages.
European Examination Report dated May 22, 2025, Application No. 21789270.2, 11pages.
Papachristos Christos et al: "Localization uncertainty-aware autonomous exploration and mapping with aerial robots using receding horizon path-planning", Autonomous Robots, NL, vol. 43,, May 30, 2019 . pp. 2131-2161.
Chen, Jingkai, et al. "Cooperative task and motion planning for multi-arm assembly systems." arXiv preprint arXiv:2203.02475 (2022). (Year: 2020).
Chinese Office Action dated Jun. 28, 2025 for Chinese Application No. 202180010425.9, 14 pages.
First Office Action dated Jul. 4, 2025 for Taiwan Application No. 110144936, with English translation.
Japanese Office Action for Japanese Patent Application No. 2024-553368, mailed Jul. 15, 2025 (with English Translation) 15 pages.
Non Final Office Action for U.S. Appl. No. 18/119,381, mailed Jun. 2, 2025, 139 pages.
Taiwan Office Action issued in connection with related Taiwan Patent Application No. 110139594 dated Jul. 4, 2025.
Chinese Office Action dated May 28, 2025, for Chinese Application No. 202180022111.0, 22 pages (English translation).
Communication Pursuant to Article 94(3) EPC issued in European Application No. 19751574.5-1201 dated Jun. 18, 2025, 7 pages.
Zhanxia Zhu, et al., "Obstacle Avoidance Path Planning of Space Redundant Manipulator Based on a Collision Detection Algorithm", Journal of Northwestern Polytechnical University, Issue 01, Feb. 15, 2020.

* cited by examiner

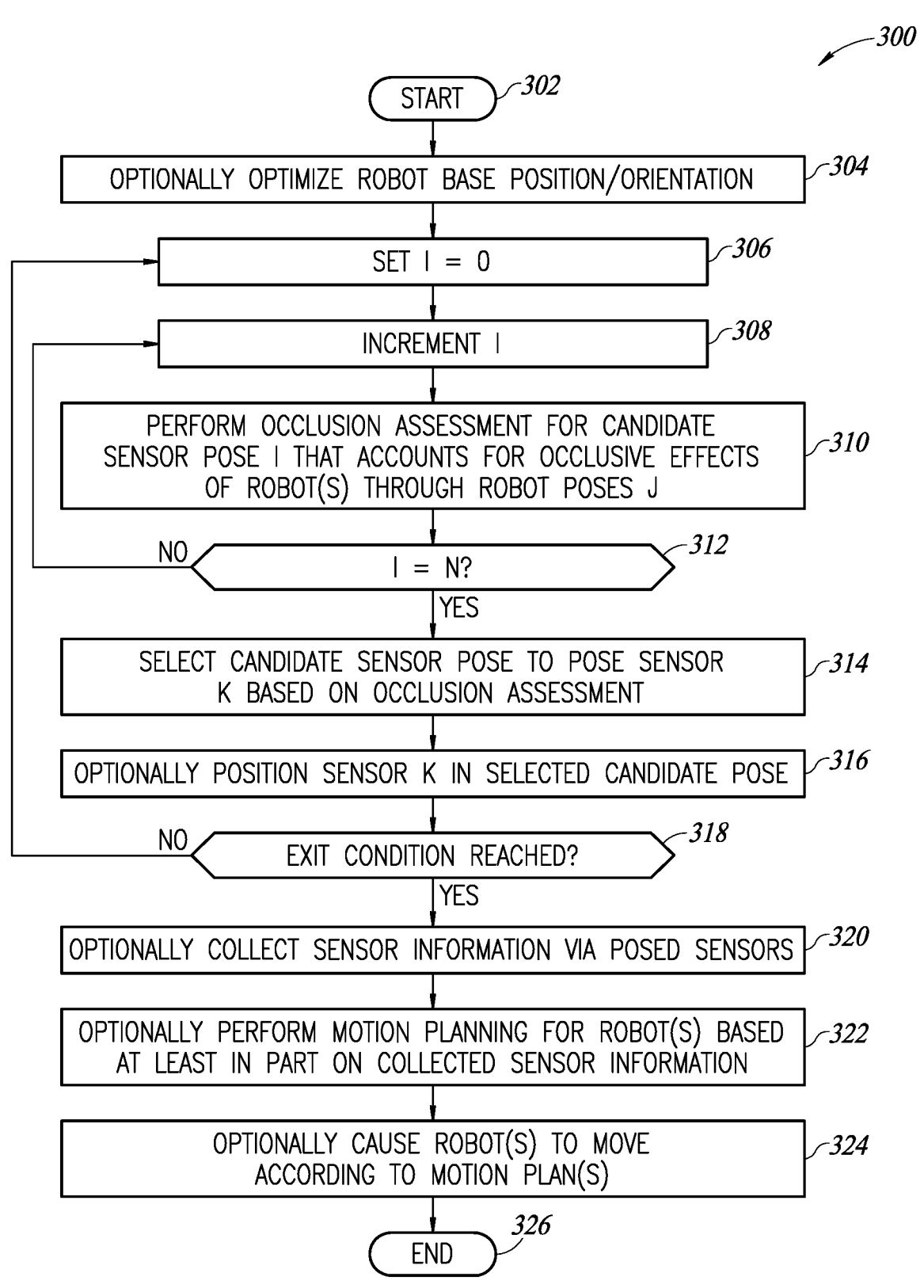

*300*

START *302*

OPTIONALLY OPTIMIZE ROBOT BASE POSITION/ORIENTATION *304*

SET I = 0 *306*

INCREMENT I *308*

PERFORM OCCLUSION ASSESSMENT FOR CANDIDATE SENSOR POSE I THAT ACCOUNTS FOR OCCLUSIVE EFFECTS OF ROBOT(S) THROUGH ROBOT POSES J *310*

NO — I = N? *312*

YES

SELECT CANDIDATE SENSOR POSE TO POSE SENSOR K BASED ON OCCLUSION ASSESSMENT *314*

OPTIONALLY POSITION SENSOR K IN SELECTED CANDIDATE POSE *316*

NO — EXIT CONDITION REACHED? *318*

YES

OPTIONALLY COLLECT SENSOR INFORMATION VIA POSED SENSORS *320*

OPTIONALLY PERFORM MOTION PLANNING FOR ROBOT(S) BASED AT LEAST IN PART ON COLLECTED SENSOR INFORMATION *322*

OPTIONALLY CAUSE ROBOT(S) TO MOVE ACCORDING TO MOTION PLAN(S) *324*

END *326*

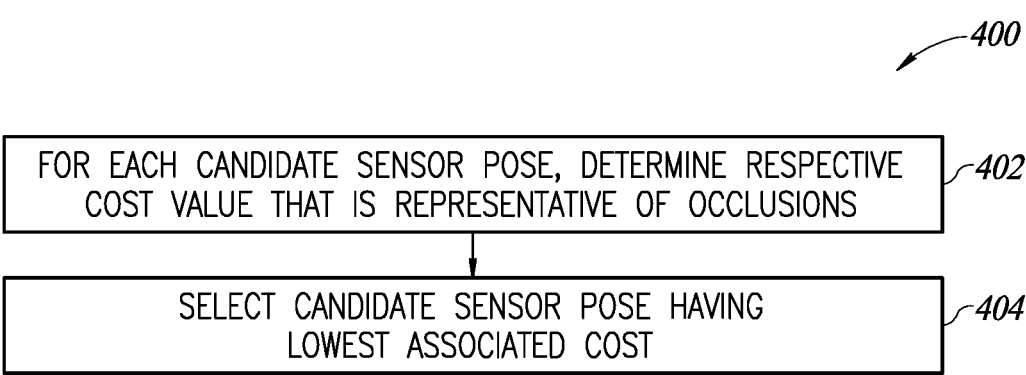

| | |
|---|---|
| FOR EACH CANDIDATE SENSOR POSE, DETERMINE RESPECTIVE COST VALUE THAT IS REPRESENTATIVE OF OCCLUSIONS | _402_ |
| SELECT CANDIDATE SENSOR POSE HAVING LOWEST ASSOCIATED COST | _404_ |

START _502_

INITIALIZE COST OF ALL CANDIDATE SENSOR POSES _504_

INITIALIZE VOXEL COUNTER V FOR OUTER LOOP _506_

INCREMENT VOXEL COUNTER V FOR OUTER LOOP _508_

INITIALIZE RESPECTIVE OCCLUSION VALUE FOR ALL VOXELS IN WORKSPACE _510_

DETERMINE RESPECTIVE OCCLUSION VALUE FOR ALL VOXELS IN WORKSPACE _512_

AGGREGATE RESPECTIVE COSTS FOR EACH CANDIDATE SENSOR POSE _514_

NO VOXEL COUNTER V = LAST VOXEL? _516_

YES

END _518_

FIG. 5A

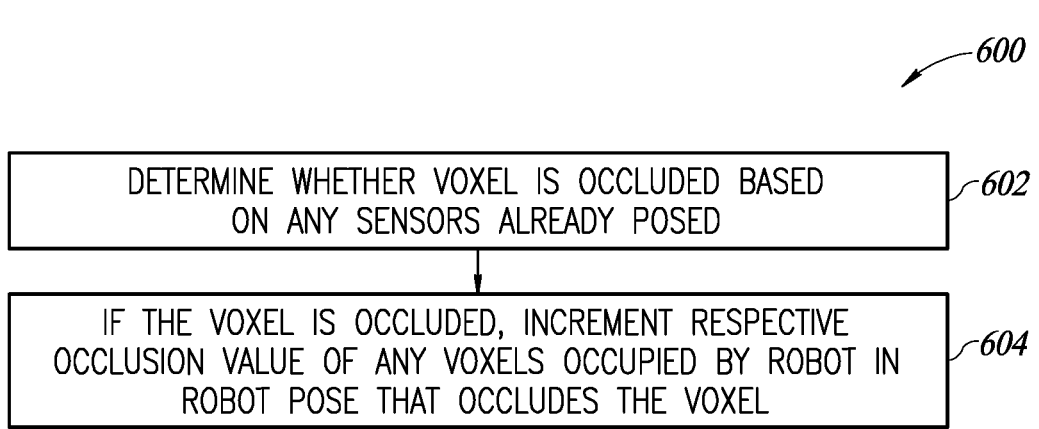

*600*

*602* — DETERMINE WHETHER VOXEL IS OCCLUDED BASED ON ANY SENSORS ALREADY POSED

*604* — IF THE VOXEL IS OCCLUDED, INCREMENT RESPECTIVE OCCLUSION VALUE OF ANY VOXELS OCCUPIED BY ROBOT IN ROBOT POSE THAT OCCLUDES THE VOXEL

FIG. 6

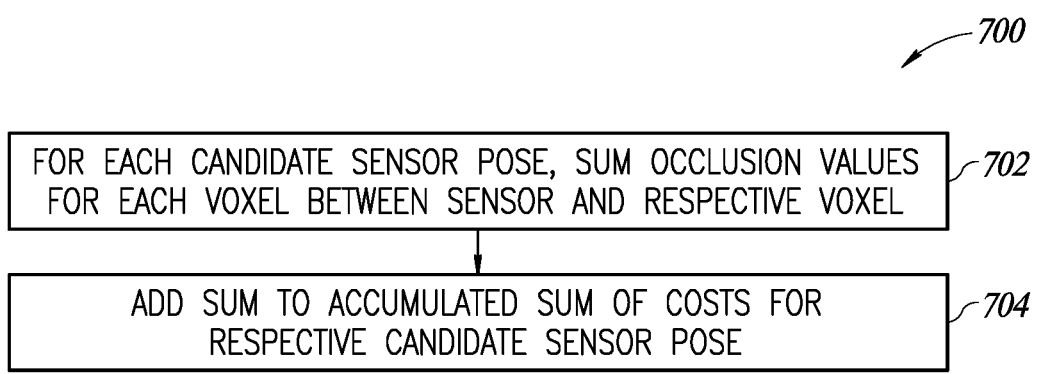

*700*

*702* — FOR EACH CANDIDATE SENSOR POSE, SUM OCCLUSION VALUES FOR EACH VOXEL BETWEEN SENSOR AND RESPECTIVE VOXEL

*704* — ADD SUM TO ACCUMULATED SUM OF COSTS FOR RESPECTIVE CANDIDATE SENSOR POSE

FIG. 7

CONFIGURATION OF ROBOT OPERATIONAL ENVIRONMENT INCLUDING LAYOUT OF SENSORS

TECHNICAL FIELD

The present disclosure generally relates to robotics, for example a multi-robot operational environment or shared workspace, and in particular to a layout of the operational environment including placement and orientation of sensors in a robot operational environment, and optionally motion planning and robot operation based on sensed aspects of the operational environment.

BACKGROUND

Description of the Related Art

Various applications employ one or more robots in a robot operational environment. The robot operational environment may contain a single robot, or may take the form of a shared workspace or a common operational environment. For example, two or more robots may be employed in performing tasks on or with one or more objects or work pieces in a common operational environment, for instance threading bolts to a chassis where the robots may overlap in range of motion.

Motion planning is a fundamental problem in robot control and robotics in general. A motion plan specifies a path that a robot can follow from a starting state to a goal state, typically to complete a task without colliding with any obstacles in an operational environment or with a reduced possibility of colliding with any obstacles in the operational environment. Challenges to motion planning involve the ability to perform motion planning at fast speeds, while possibly accounting for environmental change (e.g., changing location or orientation of obstacles in the environment). Challenges further include performing motion planning using relatively low cost equipment, at relative low energy consumption, and/or with limited amounts of storage (e.g., memory circuits, for instance on processor chip circuitry).

BRIEF SUMMARY

When performing motion planning, it is desirable to generate motion plans that are efficient for the robot(s) to execute. Efficiency may be measured in terms of time to execute or complete one or more tasks, in total number of motions required to complete one or more tasks, in a total expenditure of energy to complete one or more tasks, and/or in a total number of times or amount of time that a robot sits idle, for example waiting for another robot to clear a shared region or workspace. When performing motion planning, it is desirable to generate motion plans that are robust (e.g., motion plans that are guaranteed or highly likely to be fully executed in order to successfully complete one or more tasks, for instance without a collision). When performing motion planning, it is desirable to quickly generate motion plans, allowing a system to quickly adapt to changes in the operational environment, for instance adapting to changes in real time. When performing motion planning, it is desirable to generate motion plans in a computationally efficient manner, reducing the computational resources (e.g., hardware, computational cycles, energy usage) employed in motion planning.

Many operational environments will include one or more robots and a perception system to collect information about the operational environment including information that represents which regions or volumes of the operational environment are occupied. It is desirable to set up the operational environment in a way that reduces occlusions of the one or more sensors of a perception system used to monitor the operational environment. When motion planning, occlusions are typically treated as occupied space in order to prevent collisions with obstacles which may or may not reside in the occluded space. However, the more space that is indicated as being occupied, the more difficult it is to find an efficient motion plan for a robot to carry out a given task.

Occlusions may result, for example, where a robot or portion thereof is positioned (e.g., intervening) between a sensor and a given location (e.g., voxel) in the operational environment. In such a situation, the given voxel is occluded (i.e., not visible or not detectable) by the sensor. Occlusions can present a significant problem where a robot can take on a sizeable number of robot poses. Each robot pose presents a risk of occlusion, as does the transitions between the robot poses. The problem is further exacerbated where there are multiple robots in the operational environment, each capable of moving between a relatively large number of robot poses, as the number of combinations or permutations quickly grows.

Thus, it is desirable to optimize a layout of the sensors to minimize or reduce occlusions of the sensor(s) by the robots, as well as occlusions by other objects (e.g., obstacles) in the operational environment.

Systems and methods are described that allow the optimization of a layout of an operational environment in which one or more robots operate and in which one or more sensors are posed (i.e., positioned and oriented) to at least reduce or minimize occlusion, in order to improve the computational efficiency of motion planning itself, and/or improve an efficiency and/or robustness of motion plans generated by the motion planning. A respective position and/or orientation of one or more sensors may be determined while taking into account the various robot poses of the robot(s) and transitions between robot poses, to enhance sensor coverage of the operational environment, that is to provide sensor coverage with a reduced occurrence of occlusions. For instance, cost values that represent occlusion may be determined, and candidate sensor poses evaluated based on cost values or aggregated cost. Reducing occlusions may significantly enhance motion planning for robots, producing motion plans that are more robust (e.g., higher probability of producing a solution without collisions) and/or motion plans that are more efficient to perform (e.g., faster to complete a task, lower number of poses to complete a task, lower energy consumption to complete a task), and/or reducing the computational resources (e.g., hardware, computational cycles, energy consumption) required to perform the motion planning to produce viable motion plans. Such is referred to herein as optimizing sensor pose (i.e., sensor position and/or orientation), even though any given implementation may not result in an optimum or optimal (i.e., objectively most optimal) solution, but rather result in only an optimized or improved solution. The total number of sensors to be placed may be defined before execution, or may not be defined or otherwise known before execution, and in fact may be determined only after several iterations, upon reaching a termination condition. In many implementations the sensors will take the form of digital cameras, each with a respective field-of-view which encompasses a portion of the operational environment dictated by the position and orientation of the sensor. However, the various implementations described herein are not limited to digital cameras, but rather can be applied to almost any type of sensor that may be employed in sensing conditions in an operational environment in which one or more robots operate, including but not limited to radar, LIDAR, sonar, passive infrared (PIR) motion detector, etc.

Optimization may employ one or more of: a knowledge of the environment, including volumes or regions occupied by static objects, a knowledge of a position and orientation of each robot (e.g., a base of each robot) in the environment, a knowledge of a motion planning roadmap (e.g., graph of possible robot poses and transitions therebetween represented in a configuration (C-space) of the robot), and/or a set of tasks to be performed by the robot(s). Optimization may also employ a finite set of candidate sensor poses, each candidate sensor pose which represents a tuple of a possible position and a possible orientation for the sensor in the environment.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 3 is a flow diagram that shows a high-level method of operation of a processor-based system to perform an optimization of sensor pose (i.e., sensor position and orientation) and optionally perform motion planning and control operation of one or more robots in the operational environment, according to at least one illustrated implementation.

FIG. 4 is a flow diagram that shows a method of operation of a processor-based system to perform occlusion assessment and selection of candidate sensor poses, according to at least one illustrated implementation, and which may be executed as part of performing the method of FIG. 3.

FIG. 5A is a flow diagram that shows a method of operation of a processor-based system to determine cost values that are representative of occlusions, according to at least one illustrated implementation, and which may be executed as part of performing the method of FIG. 3.

FIG. 6 is a flow diagram that shows a method of operation of a processor-based system to determine occlusion values for a voxel, according to at least one illustrated implementation, and which may be executed as part of performing the method(s) of FIGS. 5A and 5B.

FIG. 7 is a flow diagram that shows a method of operation of a processor-based system to aggregate cost for candidate sensor poses, according to at least one illustrated implementation, and which may be executed as part of performing the method(s) of FIGS. 5A and 5B.

DETAILED DESCRIPTION

Figure 1:
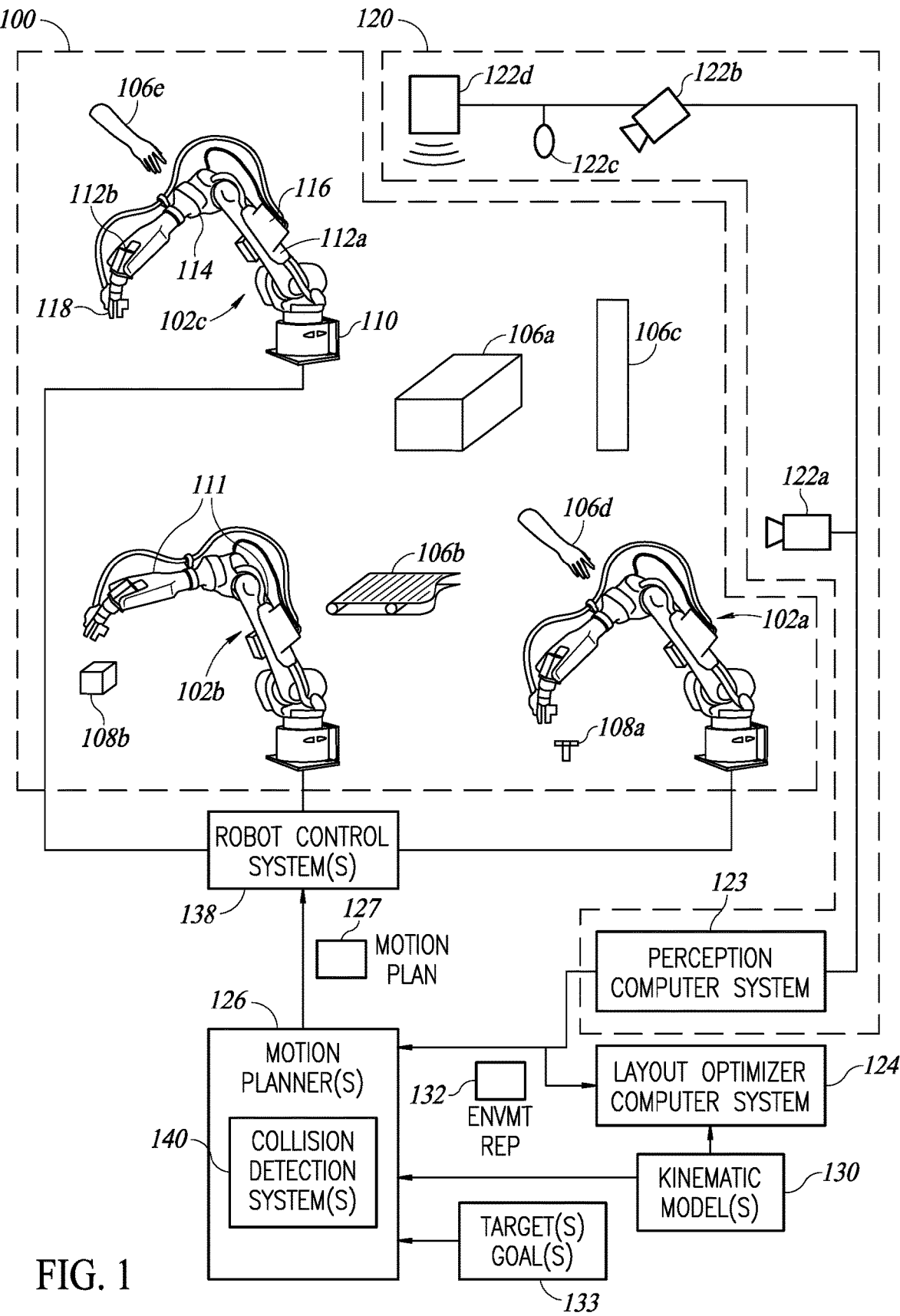
FIG. 1 is a schematic diagram of an operational environment in which a plurality of robots operate to carry out tasks, a plurality of sensors are positioned and oriented to monitor the operational environment, a perception computer system collects information from the sensors, a layout optimization system performs an optimization to configure a layout of the operational environment, and optional motion planner(s) and robot control system(s) generate motion plans and control the operation of the robots to complete tasks, according to one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims, which follow, the word "comprise" and variations thereof, such as, "comprises" and "comprising" are to be construed in an open, inclusive sense that is as "including, but not limited to."

Reference throughout this specification to "one implementation" or "an implementation" or to "one embodiment" or "an embodiment" means that a particular feature, structure or characteristic described in connection with the embodiment is included in at least one implementation or in at least one implementation embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the terms optimizing, optimize, and optimized mean that an improved result is being prepared, generated or produced, or has been prepared generated or produced. Such terms are used in their relative sense, and do not mean that an absolutely optimum value has been prepared, generated or produced.

As used in this specification and the appended claims, the terms "operational environment" or "environment" or "workspace" are used to refer to an operational environment in which one or more robots operate. The operational environment may include obstacles and/or work pieces (i.e., items with which the robots are to interact or act on or act with).

As used in this specification and the appended claims, the terms "shared operational environment" or "shared environment" or "shared workspace" are used to refer to an operational environment in which two or more robots operate, one or more portions of the shared workspace are volumes in which robots can potentially collide with one another, hence may be denominated as interference regions.

As used in this specification and the appended claims, the term "task" is used to refer to a robotic task in which a robot transitions from a pose A to a pose B, preferably without colliding with obstacles in its environment. The task may perhaps involve the grasping or un-grasping of an item, moving or dropping an item, rotating an item, or retrieving or placing an item. The transition from pose A to pose B may optionally include transitioning between one or more intermediary poses.

As used in this specification and the appended claims, the terms determine, determining and determined when used in the context of whether a collision will occur or result, mean that an assessment or prediction is made as to whether a given pose or movement between two poses via a number of intermediate poses will result in a collision between a portion of a robot and some object (e.g., another portion of the robot, a persistent obstacle, a transient obstacle, or some object other than a currently targeted object).

The headings and Abstract of the Disclosure provided herein are for convenience only and do not interpret the scope or meaning of the embodiments.

FIG. 1 shows a three-dimensional operational environment 100 in which one or more robots 102a, 102b, 102c (three shown, collectively 102) may operate, according to one illustrated embodiment. For the sake of brevity, the three-dimensional operational environment 100 is referred to herein as the environment 100. The environment 100 represents a three-dimensional space in which the robot(s) 102 may operate and move. It is noted that the environment 100 is different than a "configuration space" or "C-space" of any given robot 102.

The environment 100 can include obstacles 106a-106e (collectively 106) that represent regions of possible collision. The terms obstacle and obstacles 106 are used to indicate an object (e.g., inanimate objects including other robots, animate objects including people and other animals) which represents a risk of collision for a given robot 102.

Some of these obstacles 106a, 106b, 106c may take the form of static obstacles or objects (i.e., obstacles or objects that do not move (i.e., translate, rotate) or change shape during a relevant period or run time, (e.g., buildings, trees, rocks, furniture, pedestals, support posts, shelves). Some of these obstacles may take the form of dynamic obstacles or objects 106d, 106e (i.e., obstacles or objects that move (i.e., translate, rotate) or change shape during at least a portion of a relevant period or run time, e.g., other robots, containers, vehicles, autonomous vehicles, people, animals, rolling or shifting items) in the environment 100. For example, a set of pedestals, walls, and a support post may be fixed or may not move or change shape over a relevant period of time (e.g., the run time), and hence are considered static obstacles. Also for example, a set of containers, workpieces, and another robot 102 may move or change shape (e.g., tilt) during a relevant period of time (e.g., the run time), and hence are considered dynamic obstacles.

Some obstacles 106a-106c occupy an area or volume that does not change over time, for example remaining fixed or unchanged during operation or movement of a robot. Such obstacles may thus be denominated as static or persistent obstacles. The area or volume occupied by static or persistent obstacles (e.g., obstacles 106a-106c) may be known at a time at which a model is determined or computational circuitry is configured, a time denominated as configuration time or pre-runtime.

For other obstacles 106d, 106e, a respective area or volume the obstacle occupies changes or is expected to change over time, for example changing during operation or movement of a robot. Such obstacles may thus be denominated as dynamic or transient obstacles. The area or volume occupied by dynamic or transient obstacles (e.g., obstacles 106d, 106e) is typically not known during configuration time, but rather is determined during robot operation or during a runtime.

The environment 100 may optionally include one or more target objects 108a, 108b (two shown, collectively 108) with which the robots 102 are intended to interact, for example by grasping the target object 108, moving the target object 108, or otherwise engaging the target object 108 to perform some defined task or operation. The target object 108 is typically not considered an obstacle, but in some implementations could constitute an obstacle, for example where there is a plurality of target objects 108 which one robot 102a will engage sequentially or when considered with respect to another robot 102b, 102c which is not targeting the particular target object 108. Some environments may not include any target object, the robot(s) 102 being moved between various poses without interacting with or engaging any objects.

FIG. 1 illustrates a representative environment 100 with a limited number of obstacles 106 and target objects 108. Typical environments may include many additional obstacles 106 and target objects 108, including objects that are other robots and various other natural or artificial static and dynamic obstacles 106 or target objects 108. Some environments 100 may completely omit target objects 108, or even omit dynamic obstacles 106d, 106e. The concepts taught herein may be employed in a similar fashion with a more populated environment than that illustrated.

The robots 102 can take any of a large variety of forms. The robots 102 may be any type of robot, including, but not limited to: Cartesian, selectively compliant arm for robotic assembly (SCARA), cylindrical, delta, polar and vertically articulated. One or more of the robots 102 may also be mobile, for instance in the form of an automobile, airplane, drone, or any other vehicle that can operate autonomously or semi-autonomously (i.e., at least partially autonomously) and move in the space represented by the environment 100.

In the illustrated implementation, the robots 102 each respectively include a base 110 and an appendage 111 (only one called out) formed by a set of links 112a, 112b (only two called out, collectively 112), and a set of joints 114 (only one called out), each of the joints 114 physically coupling a respective pair of the links 112. The robots 102 can also include one or more actuators 116 (only one called out) that drive movement of one link 112a relative to another link 112b, or relative to the base 110. The actuators 116 may take any of a large variety of forms, for example, electric motors, stepper motors, solenoids, electromagnets, pneumatic actuators or hydraulic actuators coupled and operable to move the linkages in response to control or drive signals. Pneumatic actuators may, for example, include one or more pistons, cylinders, valves, reservoirs of pressurized gas, and/or pressure sources (e.g., compressor, blower). Hydraulic actuators may, for example, include one or more pistons, cylinders, valves, reservoirs of pressurized fluid (e.g., low compressibility hydraulic fluid), and/or pressure sources (e.g., compressor, blower). The robot 102 may also include an end effector or end of arm tool 118 (only one called out in FIG. 1), for example a grasper with opposable digits, hook, or vacuum port to physically engage target objects 108 in the environment 100. One or more of the robots 102 may, for instance, carry one or more robot mounted sensors (e.g., cameras, position or rotary encoders, proximity sensors, inertial sensors). In some implementations one or more of the robots 102 may, for example, take the form of an autonomous vehicle.

A perception system 120 may comprise one or more environmental sensors 122a, 122b, 122c, 122d (four shown, collectively 122) and an optional perception computer system 123. As described herein the position and orientation of the sensors 122 in the environment 100, and even the total number of sensors 122 in the environment 100, may be optimized to reduce or even eliminate occlusions, thereby improving motion planning and motion plans to drive the robots to complete one or more tasks.

The environmental sensors 122 can take any of a large variety of forms or types, for example one or more digital cameras 122a, 122b (e.g., time-of-flight digital cameras, 3D cameras), one or more motion sensors (e.g., passive-infrared motion sensors) or radars 122c, one or more LIDAR sensors 122d, one or more microphones (not shown), one or more weight sensors or load cells (not shown), one or more electric eyes (e.g., passive infrared (IR) sensors including IR light source and IR sensor) (not shown), one or more encoders (e.g., positon encoder, rotary encoder, Reed switch) (not shown), one or more temperature sensors (not shown), humidity sensors (not shown), and/or one or more pressure sensors (not shown), to name a few. The sensors 122 detect characteristics of the environment 100 including characteristics (e.g., position, orientation, shape, occupancy, movement, velocity) of the obstacles, target objects, the robots, and/or other objects in the environment 100. The sensors 122 can provide signals, wired, optically, and/or wirelessly, to the optional perception computer system 123, which collects and optionally pre-processes the collected sensor information or sensor data. The perception information or data may be raw data as sensed via one or more sensors (e.g., cameras, stereo cameras, time-of-flight cameras, LIDAR) and/or as converted to digital representations of obstacles by the perception computer system 123, which may generate a respective discretization of a representation of an environment in which the robots 102 will operate to execute tasks for various different scenarios. In at least some implementations perception data may take the form of a point cloud.

The optional perception computer system 123 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. The perception computer system 123 may be communicatively coupled (e.g., wired, optically, wirelessly) to one or more of the sensors 122 to receive sensed information, for instance perception data, either directly or indirectly. The perception computer system 123 may generate digital or virtual models (denoted as "environmental representations") 132 of the environment 100 based at least in part on the perception data.

In particular, in at least some implementations, execution of the processor-executable instructions by one or more processors may cause the perception computer system 123 to process or pre-process some or all of the received sensor information. As described herein, the perception computer system 123 may generate one or more digital representations or models 132 of the three-dimensional operational environment 100, including any obstacles present in the environment 100 at a given period during the runtime. The digital representations or models 132 of the environment 100 may advantageously be used for optimization of a layout and/or for motion planning for a given robot 102, as described herein. The digital representations or models 132 may take any of a large variety of forms, for example an occupancy grid.

A layout optimizer computer system 124 advantageously determines optimized sensor poses (i.e., sensor position and orientation) for each of one or more of the sensors 122 in the environment 100, and may even determine a total number of the sensors 122 in the environment 100. In particular, the layout optimizer computer system 124 may determine an optimized layout of at least the sensors, which advantageously reduces or even eliminates occlusions, for example occlusions that would be caused by the robots as the robots move through a series of robot poses to complete tasks, thereby improving motion planning and motion plans to drive the robots 102 to complete one or more tasks. In some implementations, the layout optimizer computer system 124 may additionally determine an optimized layout (e.g., position and orientation of base of robot) of the robots 102 in the environment 102, for example as described in U.S. patent application 62/991,487, thereby improving motion planning and motion plans to drive the robots 102 to complete one or more tasks.

The layout optimizer computer system 124 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. The layout optimizer computer system 124 may be communicatively coupled (e.g., wired, optically, wirelessly) to the perception computer system 123 to receive digital or virtual models (denoted as "environmental representations") 132 of the environment 100, or alternatively communicatively coupled (e.g., wired, optically, wirelessly) to one or more of the sensors 122 to receive sensed information, for instance perception data, either directly or indirectly.

Optimization may employ one or more of: a knowledge of the environment, including volumes or regions occupied by static objects, a knowledge of a position and orientation of each robot (e.g., a base of each robot) in the environment, a knowledge of a motion planning roadmap (e.g., graph of possible robot poses and transitions therebetween represented in a C-space of the robot), and/or a set of tasks to be performed by the robot(s). Optimization may also employ a finite set of candidate sensor poses. Each candidate sensor pose represents a tuple of a possible position and a possible orientation for the sensor in the environment. For example, the candidate sensor poses may include a plurality of poses at each of a plurality of locations across a two-dimensional surface that corresponds to a surface in the environment, for example across a ceiling or wall.

In at least some implementations, input to the layout optimizer computer system 124 may include one or more static environment models that represent or characterize the operational environment or workspace 100, for example representing a floor, walls, ceiling, pillars, other static obstacles, etc. The operational environment or workspace 100 may be represented by one or more models, for example a geometric model (e.g., point cloud) that represents a floor, walls, ceiling, obstacles and other objects in the operational environment. Such may, for example, be represented in Cartesian coordinates.

In at least some implementations, input to the layout optimizer computer system 124 may include a set of candidate sensor poses. Alternatively, the processor-based system(s) may include a candidate sensor pose population generator (not shown). The candidate sensor pose population generator generates a set of candidate sensor poses based on provided input (e.g., physical model of the environment or room).

The input to the layout optimizer computer system 124 may include one or more robot models of each of the plurality of robots that will operate in the multi-robot operational environment. The robot models may represent or characterize each of the robots 102, for example specifying geometry and kinematics, for instance sizes or lengths, number of links, number of joints, joint types, number of links, length of links, types of end effector, ranges of motion, limits on speed, limits on acceleration or jerk. The robots 102 may be represented by one or more robot geometric models that define a geometry of a given robot 102a-102c, for example in terms of joints, degrees of freedom, dimensions (e.g., length of linkages), and/or in terms of the respective C-space of the robot 102a-102c.

The input to the layout optimizer computer system 124 may include one or more sets of tasks to be performed, for example represented as target goals (e.g., robot positions or configurations). The targets may represent various positions or configurations to which each robot or portion thereof must move in sequence or at certain times in order to complete a set of tasks. The targets may, for example, be represented in the configuration space (C-space) of the respective robots. The task may, for instance, be represented in terms of end poses, end configurations or end states, and/or intermediate poses, intermediate configurations or intermediate states of the respective robot 102a-102c. Robot poses, configurations, or states may, for example, be defined in terms of joint positions and joint angles/rotations (e.g., joint poses, joint coordinates) of the respective robot 102a-102c. The input may optionally include one or more dwell time durations which specify an amount of time a robot or portion thereof should dwell at a given target in order to complete a task (e.g., tighten a screw or nut, picking and placing objects). The dwell time durations may advantageously reflect an expected amount of time that an end effector of a robot needs to remain at a given target in order to complete a respective task.

For example, the processor-based system 124 may receive one or more models 132 of the multi-robot operational environment. The model(s) 132 may represent the physical environment in which the plurality of robots will operate, for example representing a floor, walls, and various objects in the environment.

A set of tasks may be specified as a task plan. The task plan may specify a number T tasks that need to be performed by a number robots. A task plan can be modeled as a vector per robot, where the vector is an ordered list of the tasks the respective robot is to perform, e.g., {task 7, task 2, task 9}. A task vector can also optionally include dwell time durations that specify a time duration that the robot or portion thereof should dwell at a given configuration or target. The task vector may also specify a home pose and/or other "functional poses" that are not directly related to solving tasks (e.g., a "get out of the way" or storage pose). Robot poses may be specified in the C-space of the robot.

Executing tasks by robots 102 typically employs motion planning, which in turn employs collision detection or assessment. Thus, one or more motion planners or motion planning systems 126 (only one illustrated) may be provided to perform motion planning, including collision detection or assessment. The motion planners or motion planning systems 126 are communicatively coupled (e.g., wired, optically, wirelessly) to the perception computer system 123, or alternatively directly to the sensors 122, to receive information therefrom and to generate motion plans based, at least in part, on the received information. Information may include the digital representations or models 132 (denoted as environmental representations or "ENVMT REP") of the environment 100, including any obstacles (including other robots 102) present in the environment 100. Input to the motion planner or motion planning system 126 may also include kinematic models 130 of the robots 102 and a set of tasks, targets or goals 133 to be executed by each robot 102. The kinematic models 130 may, for example, take the form of hierarchical data structures. Hierarchical data structures may, for example, take the form of one or more types of trees. For instance, suitable hierarchical data structures may include octrees, trees of axis-aligned bounding boxes (AABBs), trees of oriented (not axis-aligned) bounding boxes, trees of spheres, and/or other tree type data structures. The kinematic models 130 may, for example, take the form of non-hierarchical data structures (e.g., Euclidean Distance Field).

The motion planner(s) or motion planning system(s) 126 may be an integral part of the robots 102, or may be separate and distinct from the robots 102. In some implementations, one or more portions of the motion planner(s) or motion planning system(s) 126 may be onboard respective ones of the robots 102, while one or more other portions may be separate from (i.e., offboard) the robots 102. The motion planner(s) or motion planning system(s) 126 may include circuitry, for example one or more processors and/or one or more non-transitory processor-readable media (e.g., non-volatile memory, volatile memory, spinning storage media), and may execute one or more sets of processor-executable instructions, for example stored by the non-transitory processor-readable media. The motion planner(s) or motion planning system(s) 126 may generate motion plans 127 for causing the robots 102 to carry out particular tasks, for example moving between a series of sequential poses, preferably without collisions with obstacles 106 or with a reduced probability of collisions. The motion planner(s) or motion planning system(s) 126 may be communicatively coupled (e.g., wired, optically, wirelessly) to one or more robot control systems 138 to provide instructions thereto that cause the particular robot 102 to follow or execute the motion plan.

The motion planner(s) or motion planning system(s) 126 may include or access a collision detection system 140. The collision detection system 140 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. The collision detection system 140 advantageously employs the digital representations or models of the environment 132, and optionally the kinematic model 130 of the robot (e.g., data structure representations of the kinematic model 130) to determine or detect or assess a probability of collision of a given robot with obstacles 106 in the environment 100 in various poses or in moving between poses. Those obstacles 106 can include other robots in the environment 100. The motion planner(s) or motion planning system(s) 126 and/or collision detection system 140 may, for example, take the form the motion planning system and collision detection system described in International (PCT) patent application PCT/US2019/045270, filed Aug. 6, 2019.

The processor-based system(s) (e.g., motion planner(s) or motion planning system(s) 126 and/or collision detection system 140) may model the operational environment 100 including movement of the robots 102 therein, to determine certain attributes, for example an amount of time required to complete the tasks, a probability or rate of collision in completing the tasks, the feasibility or infeasibility of completing the tasks, the number of movements or transitions needed to complete the tasks, and/or an energy expenditure in completing the tasks. The processor-based system(s) (e.g., motion planner(s) or motion planning system(s) 126 and/or collision detection system 140) may reflect such in terms of cost, the cost generated via one or more cost functions.

The robot control system 138 may include several components, which typically are distinct, but in some implementations may be combined in a common circuit board, processor or other circuitry. For example, a set of drivers may include circuitry communicatively coupled to actuator(s) 116 to drive the actuators 116 to cause the robot 102 to adopt or move to defined poses. Drivers can, for example, include motor controllers and similar circuitry that drive any one or more of electric motors, stepper motors, solenoids, electromagnets, hydraulic pistons, pneumatic pistons, hydraulic valves, pneumatic valves, pumps or compressors for vacuum systems, hydraulic systems, and/or pneumatic systems.

Figure 2:
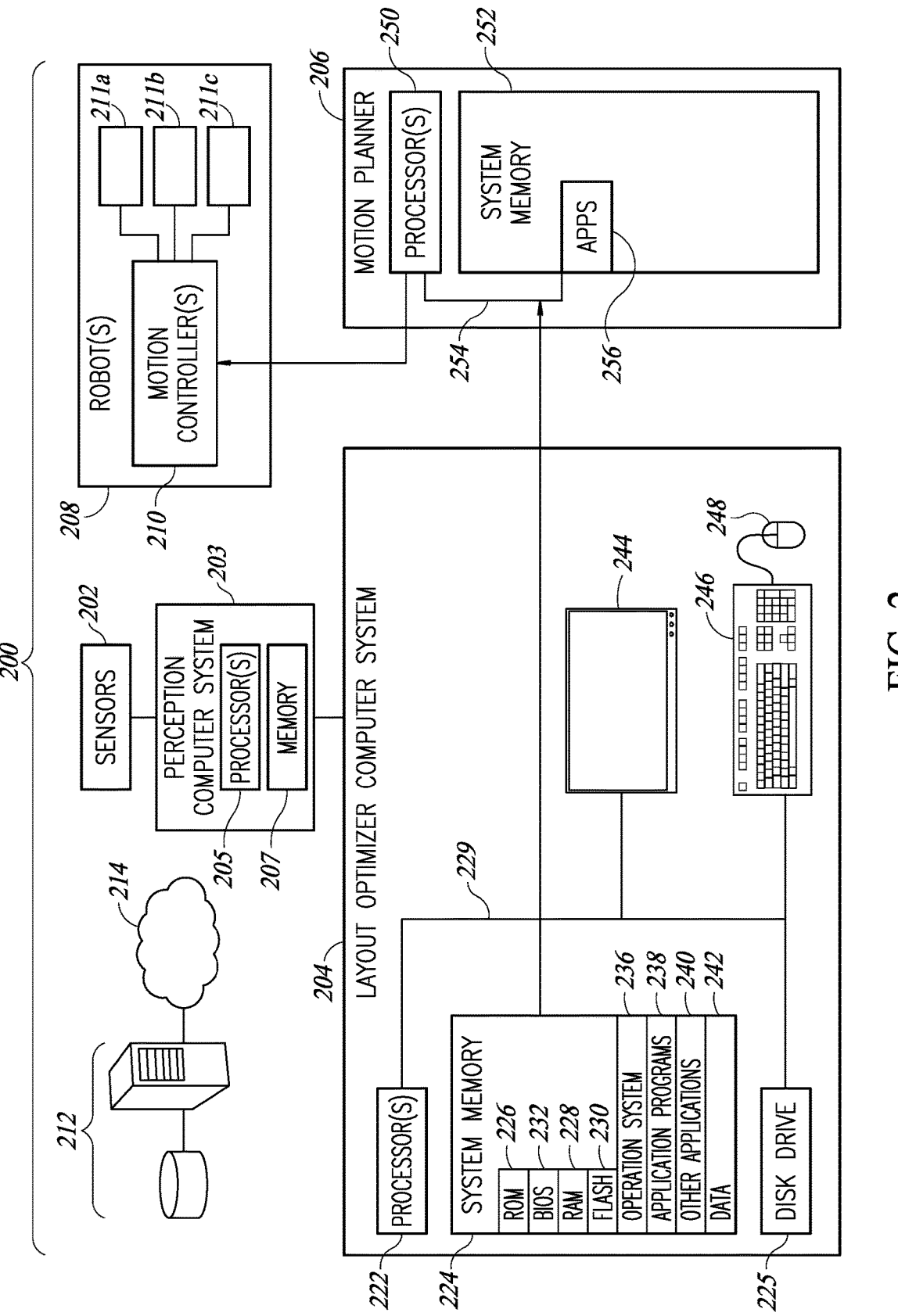
FIG. 2 is a functional block diagram of the robots, sensors, perception computer system, layout optimization system, and optional motion planner(s) and robot motion controllers of FIG. 1, the various computer systems each including one or more processors and one or more non-transitory processor-readable media that stores processor-executable instructions, according to one illustrated implementation.

FIG. 2 shows a system 200, according to at least one illustrated implementation. The system 200 may include or implement various components or structures illustrated in and described with respect to FIG. 1.

The system 200 may include one or more sensors 202, optionally one or more perception computer systems 203, one or more layout optimizer computer systems 204, one or more motion planners 206, and one or more robots 208. As described herein, the respective position and orientation of each of the sensors 202, and even the total number of sensors 202, may advantageously be determined by operation of the layout optimizer computer system(s) 204.

The one or more perception computer systems 203 may be communicatively coupled to the one or more sensors 202 to receive perception information or data therefrom. The one or more perception computer systems 203 may include one or more processors 205 and memory 207. The memory 207 stores processor-executable instructions which, when executed by the at least one processor 205, cause the at least one processor 205 to collect information or data from the sensors and generate a digital representation or model of a three-dimensional operational environment. The one or more perception computer systems 203 may be communicatively coupled to provide a digital representation or model of a three-dimensional operational environment, for example to the one or more layout optimizer computer systems 204 and/or to the one or more motion planners 206. The one or more motion planners 206 may be communicatively coupled to provide motion plans 127 (FIG. 1) to one or more robots 208 via one or more motion controllers 210.

As previously described, each robot 208 may include an appendage formed of a set of links and joints, with end-ofarm tools or end effectors at the end of the appendage, and/or may include one or more actuators 211a, 211b, 211c (three shown in FIG. 2, collectively 211) operable to move the links about the joints. Each robot 208 may include one or more motion controllers (e.g., motor controllers) 210 (only one shown) that receive control signals, for instance from the motion planner or motion planning system 206, and that provide drive signals to drive the actuators 211. The motion controllers 210 may be dedicated to controlling specific ones of the actuators 211.

An exemplary environment layout optimizer computer system 204 will be described in detail for illustrative purposes. Those of skill in the art will recognize that the description is exemplary and variations may be made to the described and illustrated layout optimizer computer system 204.

The layout optimizer computer system 204 may comprise one or more processor(s) 222, and one or more associated non-transitory computer or processor-readable storage media, for example system memory 224, disk drive(s) 225, and/or memory or registers (not shown) of the processors 222. The non-transitory computer- or processor-readable storage media 224, 225 are communicatively coupled to the processor(s) 222 via one or more communications channels, such as system bus 229. The system bus 229 can employ any known bus structures or architectures, including a memory bus with memory controller, a peripheral bus, and/or a local bus. One or more of such components may also, or instead, be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The layout optimizer computer system 204 may also be communicably coupled to one or more remote computer systems 212, e.g., server computer, desktop computer, laptop computer, ultraportable computer, tablet computer, smartphone, wearable computer and/or sensors (not illustrated in FIG. 2), that are directly communicably coupled or indirectly communicably coupled to the various components of the layout optimizer computer system 204, for example via a network interface (not shown). Remote computing systems (e.g., server computer) may be used to program, configure, control or otherwise interface with or provide input data (e.g., robot models) to the layout optimizer computer system 204. Such a connection may be through one or more communications channels 214, for example, one or more wide area networks (WANs), for instance, Ethernet, or the Internet, using Internet protocols. In some implementations, pre-runtime or configuration time calculations (e.g., modeling of robots) may be performed by a system (e.g., computer system 212) that is separate from the layout optimizer computer system 204. Runtime calculations may be performed by one or more layout optimizer computer systems 204 and/or motion planners 206.

As noted, the layout optimizer computer system 204 may include one or more processor(s) 222, (i.e., circuitry), non-transitory storage media 224, 225, and system bus 229 that couples various system components. The processors 222 may be any logic processing unit, such as one or more central processing units (CPUs), digital signal processors (DSPs), graphics processing units (GPUs), field programmable gate arrays (FPGAs), application-specific integrated circuits (ASICs), programmable logic controllers (PLCs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. The construction and operation of the various structures shown in FIG. 2 may implement or employ structures, techniques and algorithms described in or similar to those described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. patent application Ser. No. 62/865,431, filed Jun. 24, 2019, entitled "MOTION PLANNING FOR MULTIPLE ROBOTS IN SHARED WORKSPACE"; U.S. patent application 62/991,487, filed Mar. 18, 2020, entitled "DIGITAL REPRESENTATIONS OF ROBOT OPERATIONAL ENVIRONMENT, USEFUL IN MOTION PLANNING FOR ROBOTS"; and/or International (PCT) patent application PCT/US2019/045270, filed Aug. 6, 2019.

The system memory 224 may include read-only memory ("ROM") 226, random access memory ("RAM") 228, FLASH memory 230, EEPROM (not shown). A basic input/output system ("BIOS") 232, which can form part of the ROM 226, contains basic routines that help transfer information between elements within the layout optimizer computer system 204, such as during start-up.

The drive(s) 225 may be, for example, a hard disk drive for reading from and writing to a magnetic disk, a solid state (e.g., flash memory) drive for reading from and writing to solid state memory, and/or an optical disk drive for reading from and writing to removable optical disks. The layout optimizer computer system 204 may also include any combination of such drives in various different embodiments. The drive(s) 225 may communicate with the processor(s) 222 via the system bus 229. The drive(s) 225 may include interfaces or controllers (not shown) coupled between such drives and the system bus 229, as is known by those skilled in the relevant art. The drive(s) 225 and associated computer-readable media provide nonvolatile storage of computer- or processor readable and/or executable instructions, data structures, program modules and other data for the layout optimizer computer system 204. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Executable instructions and data can be stored in the system memory 224, for example an operating system 236, one or more application programs 238, other programs or modules 240 and program data 242. Application programs 238 may include processor-executable instructions that cause the processor(s) 222 to perform one or more of: collecting or receiving sensor or perception data, receiving or generating a representation or model of a three-dimensional environment 132 (FIG. 1); receiving kinematic models 130 (FIG. 1) of the robots 208; optimizing sensor poses that reduce or eliminate occlusions of the sensors by objects in the environment, including occlusions that would result from movement of the robots while performing tasks. To determine an optimized (e.g., not necessarily an optimum) layout of sensors in the environment 100, the processor-executable instructions may cause the processor(s) 222 to evaluate each of a plurality of candidate sensor poses, assigning cost values that represent occlusions, aggregating cost values, and analyzing cost values to determine optimized poses and/or an optimized total number of sensors. Execution of the processor-executable instructions may additionally cause the processor(s) 222 to optimize robot poses (e.g., position and/or orientation of base) of the robots in the environment. Such operation can be executed as described herein (e.g., with reference to FIGS. 3 and 7) and in the references incorporated herein by reference. Application programs 238 may include one or more machine-readable and machine-executable instructions that cause the processor(s) 222 to perform other operations, for instance optionally handling perception data (captured via sensors). The processor-executable instructions cause the processor(s) 222 to construct representations or models from the perception data. In some implementations, the processor-executable instructions may cause the processor(s) 222 to construct representations or models which include a volume that more than encompasses a region occupied by a given robot, and which indicates that volume as being unoccupied, such as described in U.S. patent application 62/991,487. Such may, for instance, be used to account for various structures (e.g., cables) that extend from the robot. Application programs 238 may additionally include one or more machine-executable instructions that cause the processor(s) 222 to simulate movement of the robots along various trajectories, for instance in performing defined tasks. Application programs 238 may additionally include one or more machine-executable instructions that cause the processor(s) 222 to perform various other methods described herein and in the references incorporated herein by reference.

While shown in FIG. 2 as being stored in the system memory 224, the operating system 236, application programs 238, other applications, programs/modules 240, and program data 242 can be stored on other non-transitory computer- or processor-readable media, for example drive(s) 225.

Although not required, many of the implementations will be described in the general context of computer-executable instructions, such as program application modules, objects, or macros stored on computer- or processor-readable media and executed by one or more computers or processors. In various implementations, operations may be performed entirely in hardware circuitry or as software stored in a memory storage, such as system memory 224, and executed by one or more hardware processors 222, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage.

The layout optimizer computer system 204 may optionally include one or more input/output components, for example a monitor or touchscreen display 244, a keypad or keyboard 246, and/or pointing device such as a computer mouse 248.

Those skilled in the relevant art will appreciate that the illustrated implementations, as well as other implementations, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The implementations or embodiments or portions thereof (e.g., at configuration time and runtime) can be practiced in distributed computing environments where tasks or modules are performed by remote processing devices, which are linked through a communications network. In a distributed computing environment, program modules may be located in both local and remote memory storage devices or media. However, where and how certain types of information are stored may be important to help improve operation, including determining an optimized layout for sensor poses.

The motion planner or motion planning system 206 may comprise one or more processor(s) 250, and one or more associated non-transitory computer or processor-readable storage media, for example system memory 252, disk drives (not shown), and/or registers (not shown) of the processors 250. The non-transitory computer- or processor-readable storage media (e.g., system memory 252) are communicatively coupled to the processor(s) 250 via one or more communications channels, such as system bus 254. The system bus 254 can employ any known bus structures or architectures, including a memory bus with memory controller, a peripheral bus, and/or a local bus. One or more of such components may also, or instead, be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®. One or more communications ports (not shown) can provide communications between the motion planner or motion planning system 206 and the perception computer system 203 and/or the motion controllers 210. The motion planner or motion planning system 206 may optionally be communicatively coupled (e.g., wired, optically, wirelessly) to a computer or terminal (not shown) to allow for user input (e.g., indication of a motion subdivision granularity value or specification) and to provide user output.

The motion planner or motion planning system 206 may receive representations or models of the environment which represent, or are otherwise based on, perception information collected via sensors 202. The motion planner or motion planning system 206 may also receive robot models, tasks, target goals, limits on total number of robots, limit on tasks per robot, bounds or constraints on variables or other parameters, and/or limits on iterations.

The motion planner or motion planning system 206 executes processor-executable instructions (Apps 256) that cause the motion planner or motion planning system 206 to perform motion planning, typically relying on collision assessment to produce motion plans for the robots to perform tasks. The motion planner or motion planning system 206 may, for example, construct motion plans by performing collision detection or assessment, update costs of edges in motion planning graphs based on collision detection or assessment, and perform path search or evaluation.

In some implementations, sensor pose optimization may be one aspect of overall workspace optimization. Workspace optimization may also include optimization of a position and/or orientation of a respective base of each robot that will operate in the workspace, for example as described in U.S. patent application 62/964,405. Such may, for example, include: generating populations of candidate solutions (e.g., candidate positions and orientations for base of robot(s)), modeling of candidate solutions, producing or determining costs associated with respective candidate solutions based at least in part on the modeling, performing an optimization on the population of candidate solutions by an optimization engine that co-optimizes across a set of two or more non-homogenous parameters for two or more of: the respective base position and orientation of the robots, an allocation of the tasks to respective ones of the robots, and the respective target sequences for the robots; and/or providing output that can be used to position and orient robots in a multi-robot operational environment and cause the robots to perform tasks.

FIG. 3 shows a method 300 of operation of a processor-based system to perform an optimization of sensor pose and optionally perform motion planning and control operation of one or more robots in an operational environment, according to at least one illustrated implementation. The processor-based system may comprise at least one processor and at least one non-transitory processor-readable medium that stores at least one of data and processor-executable instructions. When executed by the at least one processor, the processor-executable instructions cause the at least one processor to execute the various operations or acts of the method 300.

The method 300 may be performed to determine a respective position and/or orientation of one or more sensors to enhance coverage of the operational environment, that is to provide coverage with a reduced occurrence of occlusions. As previously noted in the Summary section, reducing occlusions may significantly enhance motion planning for robots, producing motion plans that are more robust and/or more efficient to perform, and/or reducing the computational resources required to perform the motion planning. Such is referred to herein as optimizing sensor pose, even though the execution of the method 300 may not result in an optimum (i.e., objectively most optimal) solution but rather only an optimized or improved solution. The total number of sensors to be placed may or may not be known before execution of the method, and in fact may be determined only after several iterations of the method, upon reaching a termination condition (e.g., specified or optimized task completion time). In many implementations the sensors will take the form of digital cameras, each with a respective field-of-view which encompasses a portion of the operational environment dictated by the position and orientation of the sensor. However, the various implementations described herein are not limited to digital cameras, but rather can be applied to almost any type of sensor that may be employed in sensing conditions in an operational environment in which one or more robots operate, including but not limited to radar, LIDAR, sonar, passive infrared (PIR) motion detector, etc.

As previously noted, optimization may employ one or more of: a knowledge of the environment (e.g., perception data or information), including volumes or regions occupied by static objects, a knowledge of a position and orientation of each robot (e.g., a base of each robot) in the environment, a knowledge of a motion planning roadmap (e.g., graph of possible robot poses and transitions therebetween represented in a C-space of the robot) for each robot, and/or a set of tasks to be performed by the robot(s).

Optimization may also employ a finite set of candidate sensor poses. Each candidate sensor pose represents a tuple of a possible position and a possible orientation for the sensor in the environment. For example, the candidate sensor poses may include a plurality of poses at each of a plurality of locations across a two-dimensional surface that corresponds to a surface in the environment, for example across a ceiling or wall that is suitable to mount a sensor. The set of candidate sensor poses may be determined or generated or refined in a variety of ways. For example, the set of candidate sensor poses could be randomly generated, or randomly selected from all positions and orientations available in the environment 100. For example, the set of candidate sensor poses could be selected to be uniformly spaced across all available surfaces in the environment 100. One or more heuristics may be applied to determine or generate or refine a finite set of candidate sensor poses. For instance, only positions at which a sensor can be mounted and/or which has a supply of power (e.g., electrical outlet or junction box) may be included in the set of candidate sensor poses.

In some implementations, the optimization on the population of C candidate sensor poses may be performed via an optimization engine. The optimization engine may, for example, select an optimized candidate sensor pose based on an occlusion analysis, for example an occlusion analysis performed with respect to a task allocation to one or more robots and/or motion plans for one or more robots. The optimization engine may be implemented as one or more processors executing processor-executable instructions. In at least some implementations, the optimization engine may interact with a robot environment simulator in performing the optimization, for example analyzing occlusions based, at least in part, on simulation of robot movement through a series of robot poses in performing tasks. The robot environment simulator may characterize the efficiency (e.g., time to completion of a task) and the probability or rate of collision of the respective motion plan. Efficient may be used to determine a termination condition, for example determining when a sufficient number or sensors have been posed. The optimization engine may select one of the candidate sensor poses based at least in part on a respective cost associated with the candidate sensor pose. The optimization engine provides output from the optimization. In particular, the optimization engine may provide as output a position and orientation for positioning and orienting a sensor in the environment.

The method 300 starts at 302, for example starting in response to a powering on of the processor-based system or component thereof, receipt of a command, or invocation from a calling routine.

Optionally at 304, the processor-based system or a component thereof, optimizes a respective position and/or orientation of a respective base of each of one or more robots that will operate in the operational environment. Various approaches and techniques to optimize the position and/or orientation of the base of the robot(s) may be employed, including but not limited to those taught in U.S. patent application 62/964,405. Whether the position and/or orientation of the base of the robot(s) is optimized or not, a knowledge of the position and/or orientation of the base of the robot(s) as well as a knowledge of the respective motion planning roadmap for the robot(s) facilitates optimizing the pose of the sensors, which takes into account the various robot poses available for the robot to move through in performing tasks. A knowledge of the tasks to be performed can likewise facilitate the optimization of sensor poses and total number of sensors.

At 306, the processor-based system or a component thereof initializes a candidate sensor pose counter I, for example setting the candidate sensor pose counter I to zero. The candidate sensor pose counter I is used to allow the processor-based system or a component thereof to iterate through a plurality of candidate sensor poses, as part of evaluating the candidate sensor poses to be used in posing a sensor (e.g., digital camera) in an operational environment in which one or more robots will operate.

At 308, the processor-based system or a component thereof increments the candidate sensor pose counter I.

At 310, the processor-based system or a component thereof performs occlusion assessment for a candidate sensor pose indicated by the current candidate sensor pose counter I. The occlusion assessment accounts for the occlusive effects, if any, of one or more robots in the operational environment as the one or more robots each move or transition through a respective plurality of robot poses J. Where the operational environment includes two or more robots, the occlusion assessment accounts for the occlusive effects of combinations of robot poses for the two or more robots. For example, the occlusion assessment may assess the occlusive effects of a second robot in each of a plurality of respective robot poses while a first robot is in a respective first one of the robot poses, and then assess the occlusive effects of a second robot in each of a plurality of respective robot poses while a first robot is in a respective second one of the robot poses. The occlusion assessment may assess the occlusive effects for one or more robots, for example, selecting robot poses from a set of robot poses, and analyzing the robot poses one at a time. The set of robot poses may include robot poses for one, two, or more robots. The occlusion assessment may assess the occlusive effects for various combinations of robot poses for each of two or more robots. Alternatively, a subset of the combinations of robot poses may be defined (e.g., robot poses that may be employed in performing one or more defined tasks), or heuristics employed to limit the total number evaluated. An example implementation of occlusion assessment is provided in the non-limiting example implementation of the method 300 set out below.

At 312, the processor-based system or a component thereof determines whether the candidate sensor pose counter I has reached N. If the candidate sensor pose counter I has not reached N, control returns to 308, where the candidate sensor pose counter I is incremented. If the candidate sensor pose counter I has reached N, control passes to 314.

At 314, the processor-based system or a component thereof selects a candidate sensor pose to pose a sensor K based on occlusion assessment. The selection may, for example, be based on a cost value that represents occlusive effects of positioning and orienting a sensor at the respective candidate sensor pose. An example of determining cost values and of selecting based on cost are provided in the non-limiting example implementation of the method 300 set out below. The selected sensor pose may be removed from the set of candidate sensor poses, so that the same sensor pose is not selected in subsequent iterations.

Optionally at 316, a sensor K is positioned and oriented according to the selected candidate pose. Such may be accomplished manually. Alternatively, such may even be accomplished automatically, for example via movement of one or more robots to which the sensor is physically attached or which picks and places the sensor. In some implementations, the posing of the sensor may be modeled until an acceptable layout for all sensors is determined.

At 318, the processor-based system or a component thereof determines whether a termination condition has been reached. If the termination condition has been reached, control passes to 320. If the termination condition has not been reached, control returns to 306, where the candidate sensor poses of the set of candidate sensor poses are analyzed to select another sensor pose.

The termination condition may take any one or more of a variety of forms. For example, one termination condition can be a measure of occlusion (e.g., an amount of occlusion or total number of occlusions) being below a defined threshold. Additionally or alternatively, one termination condition can be a measure of improvement in reduction of occlusion reaching a limiting value (e.g., each iteration is having a progressively smaller reduction in occlusion until further improvements are no longer justified for the given application). Additionally or alternatively, one termination condition can be a determination that a further reduction in occlusion will not significantly improve the speed or reduce the computational resources for motion planning. Additionally or alternatively, one termination condition can be a determination that a further reduction in occlusion will not significantly improve the robustness of motion plans generated using information collected by the posed sensors, or the efficiency of executing the motion plans by the robots. Additionally or alternatively, one termination condition can be based on a determined task completion time (i.e., time for robot(s) to complete one or more tasks), for example that a determined task completion time is within a specified threshold or an amount or rate of improvement (e.g., reduction) in determined task completion time over a number of cycles converges or does not improve at a desired rate. Convergence may be deemed to have occurred where, for example, a standard deviation in cost across the current population of candidate sensor poses is less than an epsilon value. Additionally or alternatively, one termination condition can be based on an assessment of collision free paths that would be available for a given motion plan. Additionally or alternatively, one termination condition can be a maximum number of sensors permitted or available. Additionally or alternatively, one termination condition can be a maximum number of permitted iterations. Additionally or alternatively, one termination condition can be a maximum time allowed for execution or iteration time.

At 320, the processor-based system (e.g., perception computer system 123) or a component thereof optionally receives sensor information collected via one or more of the sensors which are in the respective sensor poses. For example, one, two or more sensors in the form of digital cameras may collect images of the operational environment, supplying image information to a processor-based device for use in motion planning. The cameras may operate in the human visual or "white light" portion of the electromagnetic spectrum, the infrared portion of the electromagnetic spectrum, the ultraviolet portion of the electromagnetic or combinations thereof. Additionally or alternatively, one, two or more sensors in the form of radars, LIDARs, sonars, PIR motion detectors, may collect information from the operational environment, supplying collected information to a processor-based device for use in motion planning. Collected images or other information may, for example, represent a presence, position, shape, movement, trajectory, speed or acceleration of one or more objects in the operational environment. Objects may, for example, include workpieces, obstacles, and the robots. It is noted that in some implementations, a first robot may constitute an obstacle with respect to a second robot.

At 324, the processor-based system (e.g., motion planner(s) 126) or a component thereof optionally performs motion planning for one or more robots in the operational environment based at least in part on collected sensor information. The motion planning can take any of a variety of forms, at least some of which are described in International (PCT) patent applications: PCT/US2019/023031, published as WO 2019/183141; PCT/US2016/012204, published as WO 2016/122840; PCT/US2017/036880, published as WO 2019/0217857; PCT/US2019/012209, published as WO 2019/139815; PCT/US2019/016700, published as WO 2019/156984; PCT/US2019/045270, published as WO 2020/040979; and PCT/US2019/064511 and U.S. patent applications 62/856,548; 62/865,431; 62/890, 830; and 62/991,487.

At 326, the processor-based system or a component (e.g., robot control system(s) 138, motion controller(s) 210) thereof optionally causes movement of one or more portions of one or more robots in the operational environment according to generated motion plans. Such can include providing the motion plans to one or more motion controllers which are either present at the robot, or communicatively coupled to the robots. The motion controllers control one or more actuators (e.g., electric motors, solenoids, electromagnets, piston and cylinders, associated valves and/ or compressors) of the robots to cause motion. The motion plans may, for example, cause a robotic appendage to transition between a number of robot poses, for instance to perform one or more tasks. The causing of movement of one or more portions of a robot can take any of a variety of forms, at least some of which are described in International (PCT) patent applications: PCT/US2019/023031, published as WO 2019/183141; PCT/US2016/012204, published as WO 2016/122840; PCT/US2017/036880, published as WO 2019/0217857; PCT/US2019/012209, published as WO 2019/139815; PCT/US2019/016700, published as WO 2019/156984; PCT/US2019/045270, published as WO 2020/040979; and PCT/US2019/064511 and U.S. patent applications 62/856,548; 62/865,431; 62/890,830; and 62/991,487.

Once a sufficient coverage of the operational environment by the sensors has been achieved, or some other termination condition reached, the method 300 terminates or ends at 328, until invoked again. In some implementations, the method 300 is implemented each time an operational environment is initially setup, or in response to a substantial change in the operational environment, for example addition of a robot, relocation of a base of a robot, or introduction of a fixture or other substantial structure that might interfere with the collection of information by one or more sensors. For instance, addition of a table in the environment 100 may interfere with a field of view of one or more cameras, triggering the desire to determine a new set of sensor poses.

The method 300, or a portion thereof, may be performed at a configuration time or pre-runtime, which can occur before runtime. This advantageously permits some of the most computationally intensive work to be performed before runtime, when responsiveness is not a particular concern. Portions of the method 300, for example motion planning and movement of robots, may be performed at runtime.

While the method 300 is described in terms of an ordered flow, the various acts or operations will in many implementations be performed concurrently or in parallel.

A non-limiting example implementation of the method 300 is described below with reference to FIGS. 4 through 7.

Optimization of sensor layout may employ any of a large variety of optimization algorithms or techniques. Some implementations may employ cost functions to apply a cost to candidate sensor poses and to assess various candidate sensor poses based, at least in part, on a cost assessment.

For example, a processor-based system may sample candidate sensor poses from a finite set C of candidate sensor poses. The processor-based system may sample robot poses from a set RP of robot poses, for each of one or more robots. Each robot pose may, for example, be a vertex in a motion planning roadmap of the robot, or even a pose that is along an edge that connects a pair of vertices, where each edge represents a valid transition between the two poses represented by the vertices that the edge connects. For multi-robot environments, the processor-based system may sample a combination of poses from each of the robot's respective motion planning roadmaps.

The example implementation may include initializing cost values for each of the candidate sensor poses.

The example implementation may then enter an outer iterative loop, which is executed for every voxel in a workspace.

Within the outer iterative loop, a respective occlusion value for every voxel in the workspace is initialized (e.g., set to zero).

Within the outer iterative loop, a respective occlusion value for every voxel in the workspace is then determined or computed. This may include executing an inner iterative loop, to check for occlusion with respective to every robot pose. For example, for each robot pose in the set of robot poses, the processor-based system determines whether a given voxel (i.e., the voxel being evaluated in a current iteration of the outer iterative loop) is occluded, based on the sensors already posed. Notably, each voxel is occluded in a first iteration since there are not yet any sensors posed. If a voxel is determined to be occluded (i.e., not visible to or detectable by a sensor), the processor-based system increments the occlusion value of all voxels in the workspace that are occupied by one or more robots in a given pose at which the assessment occurs, the occupied volume being denominated as the robot voxels. The occlusion value is a representation of what hides a given voxel from the sensors. If the voxel is not occluded, the processor-based system addresses the next robot pose, eventually exiting from the inner iterative loop once occlusion has been checked against the various robot poses.

Within the outer iterative loop, the processor-based system may then aggregate costs for the various candidate sensor poses. For example, for each candidate sensor pose in the set, the processor-based system may determine or compute a total cost to reach a given voxel. This can be understood by imagining a straight line from a candidate sensor pose to a given voxel. The processor-based system would sum the occlusion values of each voxel along the straight line. The processor-based system may add this summed cost to the cost of the given candidate sensor pose.

On exiting the outer iterative loop, the processor-based system may then select a candidate sensor pose based on cost, for example selecting the candidate sensor pose with the least associated cost. Various least cost algorithms may be employed. Once selected, a sensor may be posed (e.g., physically, virtually) accordingly. The method may then be repeated until a termination condition is achieved, for instance posing a defined number of sensors or some other criteria (e.g., convergence of task completion time). Notably, each subsequent iteration should have fewer occluded voxels, with fewer robot poses occluding each of these voxels. It is also notable that a variety of algorithms may be employed, including "greedy" algorithms where a solution may not be guaranteed and any solution while optimized may not be the absolute optimal solution.

FIGS. 4-7 represent at least one implementation of optimization employing a cost function. Other implementations may employ other algorithms and/or cost functions.

FIG. 4 shows a method 400 of operation of a processor-based system to perform occlusion assessment and selection of candidate sensor poses, according to at least one illustrated implementation. The method 400 may be executed as part of performing the method 300 (FIG. 3). The processor-based system may comprise at least one processor and at least one non-transitory processor-readable medium that stores at least one of data and processor-executable instructions. When executed by the at least one processor, the processor-executable instructions cause the at least one processor to execute the various operations or acts of the method 400.

At 402, for each candidate sensor pose, a processor-based system or component thereof determines a respective cost value that is representative of occlusions of a sensor if positioned and oriented in the respective candidate sensor pose.

At 404, the processor-based system or component thereof selects a candidate sensor pose having lowest associated cost, as compared to other candidate sensor poses.

FIG. 5A shows a method 500a of operation of a processor-based system to determine cost values that are representative of occlusions, according to at least one illustrated implementation. The method 500a may be executed as part of performing the method 300 (FIG. 3). The processor-based system may comprise at least one processor and at least one non-transitory processor-readable medium that stores at least one of data and processor-executable instructions. When executed by the at least one processor, the processor-executable instructions cause the at least one processor to execute the various operations or acts of the method 500a.

The method 500a starts at 502, for example starting in response to a powering on of the processor-based system or component thereof, receipt of a command, or invocation from a calling routine.

At 504, a processor-based system or component thereof initializes a respective cost value of all of the candidate sensor poses in the set of candidate sensor poses. The cost value may be saved in a data structure, for example saved as a field in a record or in a vector of cost values.

At 506, a voxel counter V for an outer iterative loop is initialized. The voxel counter V may, for example, be set to a value of zero. The outer iterative loop is executed to assess occlusion for a given voxel V in each iteration, iterating through all of the voxels in the workspace.

At 508, the voxel counter V for the outer iterative loop is incremented.

At 510, the processor-based system or component thereof initializes a respective occlusion value of all of the voxels in the workspace. The occlusion value may be saved in a data structure, for example as a field in a record or in a vector of occlusion values.

At 512, the processor-based system or component thereof determines a respective occlusion value for all of the voxels in the workspace. The occlusion value may be saved in a data structure, for example saved as a field in a record or in a vector of occlusion values. Such may, for example, be performed as described with reference to the method 500b illustrated in FIG. 5B, and described below.

At 514, the processor-based system or component thereof aggregates a cost for the candidate sensor poses. The aggregated costs may be saved in a data structure, for example saved as a field in a record or in a vector of occlusion values.

At 516, the processor-based system or component thereof determines whether each voxel V has been assessed for occlusion, for example comparing a value of the voxel counter V to a total number of voxels in the workspace. If there are additional voxels to be assessed, control returns to 508. If there are not additional voxels to be assessed, control passes to 518 where the method 500*a* terminates, until invoked again.

Figure 5B:
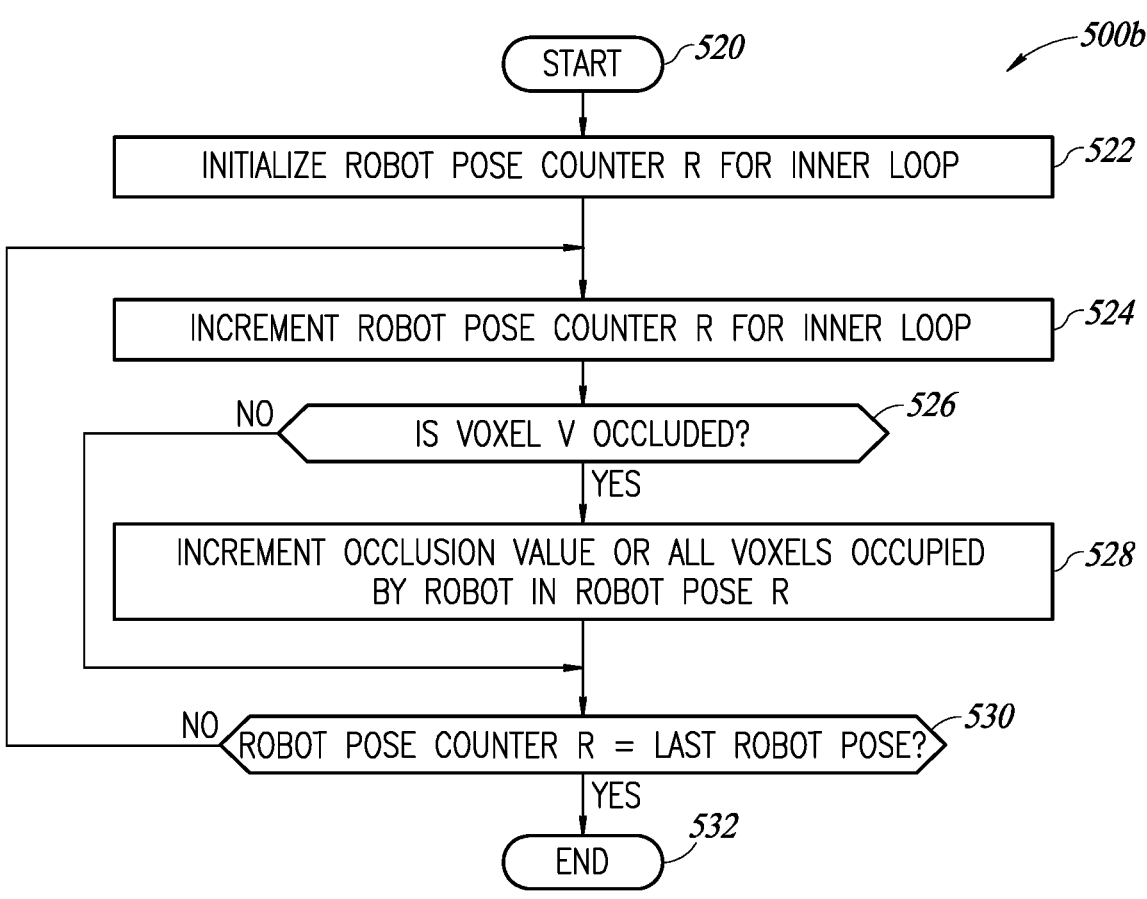
FIG. 5B is a flow diagram that shows a method of operation of a processor-based system to determine cost values that are representative of occlusions, according to at least one illustrated implementation, and which may be executed as part of performing the method of FIG. 5A.

FIG. 5B shows a method 500*b* of operation of a processor-based system to determine cost values that are representative of occlusions, according to at least one illustrated implementation. The method 500*b* may be executed as part of performing the method 500*a* (FIG. 5A), for example to determine a respective occlusion value for all of the voxels in the workspace (512 of FIG. 5A). The processor-based system may comprise at least one processor and at least one non-transitory processor-readable medium that stores at least one of data and processor-executable instructions. When executed by the at least one processor, the processor-executable instructions cause the at least one processor to execute the various operations or acts of the method 500*b*.

The method 500*b* starts at 520, for example starting in response to a powering on of the processor-based system or component thereof, receipt of a command, or invocation from a calling routine.

At 522, a processor-based system or component thereof initializes a robot pose counter R, for an inner iterative loop. The inner iterative loop may be considered inner with respect to the outer iterative loop described with reference to FIG. 5A.

At 524, the processor-based system or component thereof increments the robot pose counter R for the inner iterative loop.

At 526, the processor-based system or component determines if a given voxel V is occluded, where the given voxel V is the voxel being assessed in a current iteration of the outer iterative loop. If the given voxel V is occluded, control passes to 528, where the processor-based system or component increments an occlusion value of all voxels that are occupied by the robot(s) in the current respective robot pose(s) R. Notably, where the environment includes a number n of robots, each robot capable of assuming a number p of possible robot poses, the total number of robot poses in the set of robot poses RP to consider in the inner iterative loop may be given by the product n*p. If the given voxel V is not occluded, control passes directly to 530.

At 530, the processor-based system or component thereof determines whether each robot pose has been evaluated for occlusion, for example comparing a value of the robot pose counter R to a total number of robot poses available to the robot(s). If there are additional robot poses to be evaluated, control returns to 524. If there are not additional robot poses to be evaluated, control passes to 532 where the method 500*b* terminates, until invoked again.

FIG. 6 shows a method 600 of operation of a processor-based system to determine occlusion values for a voxel, according to at least one illustrated implementation. The method 600 may be executed as part of performing the method(s) 500*a*, 500*b* (FIGS. 5A and 5B). The processor-based system may comprise at least one processor and at least one non-transitory processor-readable medium that stores at least one of data and processor-executable instructions. When executed by the at least one processor, the processor-executable instructions cause the at least one processor to execute the various operations or acts of the method 600.

At 602, a processor-based system or component thereof determines whether a given voxel is occluded based on any sensors already posed and based on the set of robot poses RP which includes sampled robot poses for one or more robots that will operate in the environment. Notably, where the environment includes multiple robots, a given voxel may be occluded by none, one, two or more robots. Each robot pose may be evaluated one at a time, for example iterating through the set of robot poses RP, for instance from a first robot pose to an $n^{th}$ robot pose, where the robot poses in the set of robot poses RP may be for one, two or more robots.

At 604, if the voxel is occluded, the processor-based system or component thereof increments a respective occlusion value of any voxels that are occupied by a robot when the respective robot is in the particular robot pose in which the respective robot or portion thereof occludes the given voxel. As noted above, a given pixel may be concurrently occluded by two or more robot poses.

FIG. 7 shows a method 700 of operation of a processor-based system to aggregate cost for candidate sensor poses, according to at least one illustrated implementation. The method 700 may be executed as part of performing the method(s) 500*a*, 500*b* (FIGS. 5A and 5B). The processor-based system may comprise at least one processor and at least one non-transitory processor-readable medium that stores at least one of data and processor-executable instructions. When executed by the at least one processor, the processor-executable instructions cause the at least one processor to execute the various operations or acts of the method 700.

At 702, for each candidate sensor pose a processor-based system or component thereof sums the occlusion values for each voxel between the sensor and the respective voxel.

At 704, the processor-based system or component thereof adds the sum of the occlusion values to an accumulated sum of costs for the respective candidate sensor pose. The accumulated sum of costs may be saved in a data structure, for example as a field in a record or in a vector of occlusion values.

EXAMPLES

The structures and algorithms described herein may, in at least some implementations, operate without cameras or other perception sensors. For example, a first iteration of the method 300 (FIG. 1) may execute before any sensors have been positioned and/or oriented in the environment 100 (FIG. 1). In at least some implementations, coordination between the robots relies on the geometric models of the robots, the ability of the robots to communicate their respective motion plans, and geometric models of a shared workspace. In other implementations, visual or other perception may optionally be employed, for example to avoid humans or other dynamic obstacles that might enter or occupy portions of the shared workspace.

Wide varieties of algorithms are used to solve motion-planning problems. Each of these algorithms typically need to be able to determine whether a given pose of a robot or a motion from one pose to another pose results in a collision, either with the robot itself or with obstacles in the environment. Virtual collision assessment or checking can be performed "in software" using processors that execute processor-executable instructions from a stored set of processor-executable instructions, to perform an algorithm. Virtual collision assessment or checking can be performed "in hardware" using a set of dedicated hardware circuits (e.g., collision checking circuits implemented in a field programmable gate array (FPGA), application specific integrated circuit (ASIC)). Such circuits may, for example, represent volumes swept by a robot/robotic appendage or portion thereof (i.e., swept volumes) during a respective motion or transition between two states. The circuits may, for example, produce a Boolean evaluation indicative of whether a motion will collide with any obstacles, where at least some of the obstacles represent volumes swept in executing a motion or transition by the other robots operating in the shared workspace.

EXAMPLES

Example 1. A method of operation of a processor-based system to facilitate robot operation, the method comprising:

for each of a plurality of candidate sensor poses, performing an occlusion assessment that accounts for an occlusive effect of at least a first robot in the operational environment as the first robot moves through each of a plurality of robot poses of the first robot; and selecting one of the candidate sensor poses to pose a first sensor based at least in part on the assessment of occlusion.

Example 2. The method of Example 1 wherein the sensor is a camera, the camera having a respective field-of-view of an operational environment for each of the candidate sensor poses, and selecting one of the candidate sensor poses to pose a first sensor based at least in part on the assessment of occlusion includes selecting one of the candidate sensor poses to pose a first camera based at least in part on the assessment of occlusion.

Example 3. The method of Example 1 wherein performing an occlusion assessment that accounts for an occlusive effect of at least a first robot in the operational environment as the first robot moves through each of a plurality of robot poses of the first robot includes performing an occlusion assessment for each of a number of robot poses from a C-space roadmap of poses realizable by the first robot.

Example 4. The method of Example 1 wherein performing an occlusion assessment that accounts for an occlusive effect of at least a first robot in the operational environment as the first robot moves through each of a plurality of robot poses of the first robot includes performing an occlusion assessment for each of a number of robot poses selected from a C-space roadmap of poses realizable by the first robot based at least in part on a task to be performed by the first robot.

Example 5. The method of Example 1 wherein performing an occlusion assessment that accounts for an occlusive effect of at least a first robot in the operational environment as the first robot moves through each of a plurality of robot poses of the first robot includes performing an occlusion assessment for each of the number of robot poses sampled from a roadmap of poses realizable by the first robot, the roadmap in the form of a graph comprising a set of nodes that represent respective robot poses in a C-space of the robot and a plurality of edges that couple pairs of the nodes and which represent transitions between the respective robot poses represented by the nodes which the respective edge couple.

Example 6. The method of Example 1 wherein performing an occlusion assessment that accounts for an occlusive effect of at least a first robot in the operational environment as the first robot moves through each of a plurality of robot poses of the first robot includes performing an occlusion assessment that accounts for an occlusive effect of the first robot and at least a second robot in the operational environment as the first and the second robots move through each of a respective plurality of robot poses of the first and the second robots.

Example 7. The method of Example 6 wherein performing an occlusion assessment that accounts for an occlusive effect of the first robot and at least a second robot in the operational environment as the first and the second robots move through each of a respective plurality of robot poses of the first and the second robots includes performing the occlusion assessment based on a set of robot poses that represent a number of robot poses of the first robot and a number of robot poses of the second robot.

Example 8. The method of Example 1, further comprising:

for each of the candidate sensor poses, determining a respective cost value for the candidate sensor pose, the respective cost value representative of occlusions.

Example 9. The method of Example 1, further comprising:

in an outer iterative loop executed for each voxel in a workspace, determining a respective occlusion value for at least the other voxels in the workspace, where the occlusion values are representative of whether the voxel of a current iteration of the outer iterative loop is occluded from one or more sensors by an object positioned so as to at least partially occupy the respective voxel for which the occlusion value is being determined; and aggregating a cost for the candidate sensor poses.

Example 10. The method of Example 9, further comprising:

before determining a respective occlusion value for the voxel, for each candidate sensor pose, initializing a respective cost value of the candidate sensor pose;

in the outer iterative loop, for all of the voxels in the workspace, initializing the respective occlusion value of the voxel.

Example 11. The method of Example 9 wherein determining a respective occlusion value for the voxel of a current iteration of the outer iterative loop includes:

in an inner iterative loop, determining whether the voxel of the current iteration of the outer iterative loop is occluded based on any sensors already positioned;

in the inner iterative loop, if the voxel of the current iteration of the outer iterative loop is occluded, incrementing a respective occlusion value of any voxels occupied by an object in the form of a robot in one of the robot poses that is occluding the voxel of the current iteration of the outer iterative loop in the respective robot pose.

Example 12. The method of Example 9 wherein aggregating a cost for the candidate sensor poses includes:

for each candidate sensor pose, summing the occlusion values for each voxel between the sensor and the voxel of the current iteration of the outer iterative loop for which voxel occlusion is being assessed; and adding the sum to an accumulated sum of costs for the respective candidate sensor pose.

Example 13. The method of any of Examples 1 through 12 wherein selecting one of the candidate sensor poses to pose a first sensor based at least in part on the assessment of occlusion includes selecting the candidate sensor pose based on an associated cost of the candidate sensor pose relative to an associated cost of other ones of the candidate sensor poses.

14. The method of any of Examples 1 through 12 wherein selecting one of the candidate sensor poses to pose a first sensor based at least in part on the assessment of occlusion includes selecting the candidate sensor pose having a lowest associated cost of the candidate sensor pose relative to an associated cost of other ones of the candidate sensor poses.

Example 15. The method of Example 1, further comprising:

after selecting one of the candidate sensor poses to pose a first sensor based at least in part on the assessment of occlusion, for each of a plurality of candidate sensor poses, performing an occlusion assessment that accounts for an occlusive effect of at least a first robot in the operational environment as at least the first robot moves through each of a plurality of robot poses of the first robot; and selecting one of the candidate sensor poses to pose a second sensor based at least in part on the assessment of occlusion.

Example 16. The method of Example 15 wherein performing an occlusion assessment that accounts for an occlusive effect of at least a first robot in the operational environment as the first robot moves through each of a plurality of robot poses of the first robot includes performing the occlusion assessment which also accounts for the first sensor positioned and oriented as specified by the selected one of the candidate sensor poses for the first sensor.

Example 17. The method of Example 15 wherein the sensors are cameras, and further comprising:

receiving sensor information collected by a first one of the cameras in a first pose that corresponds to the selected sensor pose for the first sensor and from a second one of the cameras in a second pose that corresponds to the selected sensor pose for the second sensor; and performing motion planning for at least the first robot based on the received sensor information.

Example 18. The method of Example 15, further comprising:

after selecting one of the candidate sensor poses to pose a second sensor based at least in part on the assessment of occlusion, repeating until a termination condition is achieved, for each of a plurality of candidate sensor poses, performing an occlusion assessment that accounts for an occlusive effect of at least a first robot in the operational environment as at least the first robot moves through each of a plurality of robot poses of the first robot; and selecting one of the candidate sensor poses to pose an additional sensor based at least in part on the assessment of occlusion.

Example 19. A system of operation of a processor-based system to facilitate robot operation, the system comprising:

at least one processor;

at least one processor-readable medium communicatively coupled to the at least one processor and which stores processor-executable instructions that, when executed by the at least one processor, cause the at least one processor to:

for each of a plurality of candidate sensor poses, perform an occlusion assessment that accounts for an occlusive effect of at least a first robot in the operational environment as the first robot moves through each of a plurality of robot poses of the first robot; and select one of the candidate sensor poses to pose a first sensor based at least in part on the assessment of occlusion.

Example 20. The system of Example 19 wherein the sensor is a camera, the camera having a respective field-of-view of an operational environment for each of the candidate sensor poses.

Example 21. The system of Example 19 wherein to perform an occlusion assessment the instructions, when executed, cause the at least one processor to perform an occlusion assessment for each of number of robot poses from a C-space roadmap of poses realizable by the first robot.

Example 22. The system of Example 19 wherein to perform an occlusion assessment the instructions, when executed, cause the at least one processor to perform an occlusion assessment for each of a number of robot poses selected from a C-space roadmap of poses realizable by the first robot based at least in part on a task to be performed by the first robot.

Example 23. The system of Example 19 wherein to perform an occlusion assessment the instructions, when executed, cause the at least one processor to perform an occlusion assessment for each of a number of robot poses sampled from a roadmap of poses realizable by the first robot, the roadmap in the form of a graph comprising a set of nodes that represent respective robot poses in a C-space of the robot and a plurality of edges that couple pairs of the nodes and which represent transitions between the respective robot poses represented by the nodes which the respective edge couple.

Example 24. The system of Example 19 wherein to perform an occlusion assessment the instructions, when executed, cause the at least one processor to perform an occlusion assessment that accounts for an occlusive effect of the first robot and at least a second robot in the operational environment as the first and the second robots move through each of a respective plurality of robot poses of the first and the second robots.

Example 25. The system of Example 24 wherein to perform an occlusion assessment the instructions, when executed, cause the at least one processor to perform the occlusion assessment based on a set of robot poses that represent a number of robot poses of the first robot and a number of robot poses of the second robot.

Example 26. The system of Example 19 wherein, when executed, the processor-executable instructions cause the at least one processor further to:

for each of the candidate sensor poses, determine a respective cost value for the candidate sensor pose, the respective cost value representative of occlusions.

Example 27. The system of Example 19 wherein, when executed, the processor-executable instructions cause the at least one processor further to:

in an outer iterative loop executed for each voxel in a workspace, determine a respective occlusion value for at least the other voxels in the workspace, where the occlusion values are representative of whether the voxel of a current iteration of the outer iterative loop is occluded from one or more sensors by an object positioned so as to at least partially occupy the respective voxel for which the occlusion value is being determined; and aggregate a cost for the candidate sensor poses.

Example 28. The system of Example 27 wherein, when executed, the processor-executable instructions cause the at least one processor further to:

before a respective occlusion value for the voxel is determined, for each candidate sensor pose, initialize a respective cost value of the candidate sensor pose;

in the outer iterative loop, for all of the voxels in the workspace, initialize the respective occlusion value of the voxel.

Example 29. The system of Example 28 wherein to determine a respective occlusion value for the voxel of a current iteration of the outer iterative loop, when executed, the processor-executable instructions cause the at least one processor to:

in an inner iterative loop, determine whether the voxel of the current iteration of the outer iterative loop is occluded based on any sensors already positioned;

in the inner iterative loop, if the voxel of the current iteration of the outer iterative loop is occluded, increment a respective occlusion value of any voxels occupied by an object in the form of a robot in one of the robot poses that is occluding the voxel of the current iteration of the outer iterative loop in the respective robot pose.

Example 30. The system of Example 27 wherein to aggregate a cost for the candidate sensor poses, when executed, the processor-executable instructions cause the at least one processor to:

for each candidate sensor pose, sum the occlusion values for each voxel between the sensor and the voxel of the current iteration of the outer iterative loop for which occlusion is being assessed in the current iteration of the outer iterative loop; and add the sum to an accumulated sum of costs for the respective candidate sensor pose.

Example 31. The system of any of Examples 19 through 30 wherein to select one of the candidate sensor poses to pose a first sensor based at least in part on the assessment of occlusion, when executed, the processor-executable instructions cause the at least one processor to: select the candidate sensor pose based on an associated cost of the candidate sensor pose relative to an associated cost of other ones of the candidate sensor poses.

Example 32. The system of any of Examples 19 through 30 wherein to select one of the candidate sensor poses to pose a first sensor based at least in part on the assessment of occlusion, when executed, the processor-executable instructions cause the at least one processor further to: select the candidate sensor pose having a lowest associated cost of the candidate sensor pose relative to an associated cost of other ones of the candidate sensor poses.

Example 33. The system of Example 19 wherein, when executed, the processor-executable instructions cause the at least one processor further to:

after selection of one of the candidate sensor poses to pose a first sensor based at least in part on the assessment of occlusion, for each of a plurality of candidate sensor poses, perform an occlusion assessment that accounts for an occlusive effect of at least a first robot in the operational environment as the first robot moves through each of a plurality of robot poses of the first robot; and select one of the candidate sensor poses to pose a second sensor based at least in part on the assessment of occlusion.

Example 34. The system of Example 33 wherein to perform an occlusion assessment, when executed, the processor-executable instructions cause the at least one processor further to: perform the occlusion assessment which also accounts for the first sensor positioned and oriented as specified by the selected one of the candidate sensor poses for the first sensor.

Example 35. The system of Example 33 wherein the sensors are cameras, and wherein, when executed, the processor-executable instructions cause the at least one processor further to:

receive sensor information collected by a first one of the cameras in a first pose that corresponds to the selected sensor pose for the first sensor and from a second one of the cameras in a second pose that corresponds to the selected sensor pose for the second sensor; and perform motion planning for at least the first robot based on the received sensor information.

CONCLUSION

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

The various embodiments described above can be combined to provide further embodiments. All of the commonly assigned US patent application publications, US patent applications, foreign patents, and foreign patent applications referred to in this specification and/or listed in the Application Data Sheet, including but not limited International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRON-MENT HAVING DYNAMIC OBJECTS"; U.S. Patent Application No. 62/626,939, filed Feb. 6, 2018, entitled "MOTION PLANNING OF A ROBOT STORING A DIS-CRETIZED ENVIRONMENT ON ONE OR MORE PRO-CESSORS AND IMPROVED OPERATION OF SAME"; U.S. Patent Application No. 62/856,548, filed Jun. 3, 2019, entitled "APPARATUS, METHODS AND ARTICLES TO FACILITATE MOTION PLANNING IN ENVIRON-MENTS HAVING DYNAMIC OBSTACLES"; U.S. Patent Application No. 62/865,431, filed Jun. 24, 2019, entitled "MOTION PLANNING FOR MULTIPLE ROBOTS IN SHARED WORKSPACE"; U.S. Patent Application No. 62/964,405, filed Jan. 22, 2020, entitled "CONFIGURA-TION OF ROBOTS IN MULTI-ROBOT OPERATIONAL ENVIRONMENT"; and U.S. Patent Application No. 63/009,583, filed Apr. 14, 2020, entitled "CONFIGURA-TION OF ROBOT OPERATIONAL ENVIRONMENT INCLUDING LAYOUT OF SENSORS" are incorporated herein by reference, in their entirety. These and other changes can be made to the embodiments in light of the above-detailed description. In general, in the following claims, the terms used should not be construed to limit the claims to the specific embodiments disclosed in the speci-fication and the claims, but should be construed to include all possible embodiments along with the full scope of equivalents to which such claims are entitled. Accordingly, the claims are not limited by the disclosure.

The invention claimed is:

1. A method of operation of a processor-based system to facilitate robot operation, the method comprising:

for each of a plurality of candidate sensor poses, perform-ing an occlusion assessment that accounts for an occlu-sive effect of at least a first robot in an operational environment as the first robot moves through each of a plurality of robot poses of the first robot; and selecting one of the plurality of the candidate sensor poses to pose a first sensor based at least in part on the assessment of occlusion, wherein performing an occlusion assessment that accounts for an occlusive effect of at least a first robot in the operational environment as the first robot moves through each of a plurality of robot poses of the first robot includes, before a runtime and prior to perfor-mance of motion planning for the first robot to generate a motion plan, performing an occlusion assessment for each of a number of robot poses sampled from a roadmap of poses realizable by the first robot, the roadmap in a form of a graph comprising a set of nodes that represent respective robot poses in a C-space of the robot and a plurality of edges that couple pairs of the nodes and which represent transitions between the respective robot poses represented by the nodes which the respective edge couple, the method further com-prising:

in an outer iterative loop executed for each voxel in a workspace, determining a respective occlusion value for each of a number of other voxels in the workspace, where the occlusion values are representative of whether the voxel of a current iteration of the outer iterative loop is occluded from one or more sensors by an object positioned so as to at least partially occupy the respective voxel for which the occlusion value is being determined; and aggregating a cost for the plurality of the candidate sensor poses.

2. The method of claim 1 wherein the first sensor is a camera, the camera having a respective field-of-view of an operational environment for each of the plurality of the candidate sensor poses, and selecting one of the plurality of candidate sensor poses to pose the first sensor based at least in part on the assessment of occlusion includes selecting one of the plurality of the candidate sensor poses to pose the camera based at least in part on the assessment of occlusion.

3. The method of claim 1 wherein performing an occlu-sion assessment that accounts for an occlusive effect of at least a first robot in the operational environment as the first robot moves through each of a plurality of robot poses of the first robot includes performing an occlusion assessment that accounts for an occlusive effect of the first robot and at least a second robot in the operational environment as the first and the second robots move through each of a respective plu-rality of robot poses of the first and the second robots.

4. The method of claim 1, further comprising:

for each of the plurality of candidate sensor poses, deter-mining a respective cost value for the plurality of the candidate sensor pose, the respective cost value repre-sentative of occlusions.

5. The method of claim 1, further comprising:

before determining a respective occlusion value for the voxel, for each candidate sensor pose, initializing a respective cost value of the candidate sensor pose;

in the outer iterative loop, for all voxels in the work-space, initializing the respective occlusion value of the voxel.

6. The method of claim 1 wherein determining a respec-tive occlusion value for the voxel of a current iteration of the outer iterative loop includes:

in an inner iterative loop, determining whether the voxel of the current iteration of the outer iterative loop is occluded based on any sensors already positioned;

in the inner iterative loop, if the voxel of the current iteration of the outer iterative loop is occluded, incre-menting a respective occlusion value of any voxels occupied by an object in the form of a robot in one of the robot poses that is occluding the voxel of the current iteration of the outer iterative loop in the respective robot pose.

7. The method of claim 1 wherein aggregating a cost for the plurality of the candidate sensor poses includes: for each candidate sensor pose, summing the occlusion values for each voxel between the sensor and the voxel of the current iteration of the outer iterative loop for which voxel occlusion is being assessed;

and adding the sum to an accumulated sum of costs for the respective candidate sensor pose.

8. The method of claim 1 wherein selecting one of the plurality of the candidate sensor poses to pose a first sensor based at least in part on the assessment of occlusion includes selecting a candidate sensor pose having a lowest associated cost of the plurality of the candidate sensor poses relative to an associated cost of other ones of the candidate sensor poses.

9. A method of operation of a processor-based system to facilitate robot operation, the method comprising:

for each of a plurality of candidate sensor poses, perform-ing an occlusion assessment that accounts for an occlusive effect of at least a first robot in an operational environment as the first robot moves through each of a plurality of robot poses of the first robot; and selecting one of the plurality of the candidate sensor poses to pose a first sensor based at least in part on the assessment of occlusion, wherein performing an occlusion assessment that accounts for an occlusive effect of at least a first robot in the operational environment as the first robot moves through each of a plurality of robot poses of the first robot includes, before a runtime and prior to performance of motion planning for the first robot to generate a motion plan, performing an occlusion assessment for each of a number of robot poses sampled from a roadmap of poses realizable by the first robot, the roadmap in a form of a graph comprising a set of nodes that represent respective robot poses in a C-space of the robot and a plurality of edges that couple pairs of the nodes and which represent transitions between the respective robot poses represented by the nodes which the respective edge couple, the method further comprising:

after selecting one of the plurality of the candidate sensor poses to pose a first sensor based at least in part on the assessment of occlusion, for each of the plurality of candidate sensor poses, performing an occlusion assessment that accounts for an occlusive effect of at least a first robot in the operational environment as at least the first robot moves through each of a plurality of robot poses of the first robot; and selecting one of the plurality of the candidate sensor poses to pose a second sensor based at least in part on the assessment of occlusion.

10. The method of claim 9 wherein performing an occlusion assessment that accounts for an occlusive effect of at least a first robot in the operational environment as the first robot moves through each of a plurality of robot poses of the first robot includes performing the occlusion assessment which also accounts for the first sensor positioned and oriented as specified by the selected one of the plurality of the candidate sensor poses for the first sensor.

11. The method of claim 9 wherein the first and the second sensors are cameras, and further comprising:

receiving sensor information collected by a first one of the cameras in a first pose that corresponds to the selected sensor pose for the first sensor and from a second one of the cameras in a second pose that corresponds to the selected sensor pose for the second sensor;

performing motion planning for at least the first robot based on the received sensor information; and driving the first robot to complete one of more task based on the motion planning.

12. The method of claim 9, further comprising:

after selecting one of the plurality of the candidate sensor poses to pose a second sensor based at least in part on the assessment of occlusion, repeating until a termination condition is achieved, for each of a plurality of candidate sensor poses, performing an occlusion assessment that accounts for an occlusive effect of at least a first robot in the operational environment as at least the first robot moves through each of a plurality of robot poses of the first robot; and selecting one of the plurality of the candidate sensor poses to pose an additional sensor based at least in part on the assessment of occlusion.

13. A system of operation of a processor-based system to facilitate robot operation, the system comprising:

at least one processor;

at least one processor-readable medium communicatively coupled to the at least one processor and which stores processor-executable instructions that, when executed by the at least one processor, cause the at least one processor to:

for each of a plurality of candidate sensor poses, perform an occlusion assessment that accounts for an occlusive effect of at least a first robot in an operational environment as the first robot moves through each of a plurality of robot poses of the first robot; and select one of the plurality of the candidate sensor poses to pose a first sensor based at least in part on the assessment of occlusion wherein, when executed, the processor-executable instructions cause the at least one processor further to:

in an outer iterative loop executed for each voxel in a workspace, determine a respective occlusion value for at least a number of other voxels in the workspace, where the occlusion values are representative of whether the voxel of a current iteration of the outer iterative loop is occluded from one or more sensors by an object positioned so as to at least partially occupy the respective voxel for which the occlusion value is being determined; and aggregate a cost for the plurality of the candidate sensor poses.

14. The system of claim 13 wherein to perform an occlusion assessment the instructions, when executed, cause the at least one processor to perform an occlusion assessment for each of a number of robot poses sampled from a roadmap of poses realizable by the first robot, the roadmap in a form of a graph comprising a set of nodes that represent respective robot poses in a C-space of the robot and a plurality of edges that couple pairs of the nodes and which represent transitions between the respective robot poses represented by the nodes which the respective edge couple.

15. The system of claim 13 wherein to perform an occlusion assessment the instructions, when executed, cause the at least one processor to perform an occlusion assessment that accounts for an occlusive effect of the first robot and at least a second robot in the operational environment as the first and the second robots move through each of a respective plurality of robot poses of the first and the second robots.

16. The system of claim 13 wherein, when executed, the processor-executable instructions cause the at least one processor further to:

for each of the plurality of the candidate sensor poses, determine a respective cost value for the candidate sensor pose, the respective cost value representative of occlusions.

17. The system of claim 13 wherein, when executed, the processor-executable instructions cause the at least one processor further to:

before a respective occlusion value for the voxel is determined, for each candidate sensor pose, initialize a respective cost value of the candidate sensor pose;

in the outer iterative loop, for all of the voxels in the workspace, initialize the respective occlusion value of the voxel.

18. The system of claim 17 wherein to determine a respective occlusion value for the voxel of a current iteration of the outer iterative loop, when executed, the processor-executable instructions cause the at least one processor to:

in an inner iterative loop, determine whether the voxel of the current iteration of the outer iterative loop is occluded based on any sensors already positioned;

in the inner iterative loop, if the voxel of the current iteration of the outer iterative loop is occluded, increment a respective occlusion value of any voxels occupied by an object in a form of a robot in one of the robot poses that is occluding the voxel of the current iteration of the outer iterative loop in the respective robot pose.

19. The system of claim 13 wherein to aggregate a cost for the plurality of the candidate sensor poses, when executed, the processor-executable instructions cause the at least one processor to:

for each candidate sensor pose, sum the occlusion values for each voxel between the sensor and the voxel of the current iteration of the outer iterative loop for which occlusion is being assessed in the current iteration of the outer iterative loop; and add the sum to an accumulated sum of costs for the respective candidate sensor pose.

20. The system of claim 13 wherein to select one of the candidate sensor poses to pose a first sensor based at least in part on the assessment of occlusion, when executed, the processor-executable instructions cause the at least one processor further to: select the candidate sensor pose having a lowest associated cost of the candidate sensor pose relative to an associated cost of other ones of the candidate sensor poses.

21. The system of claim 13 wherein, when executed, the processor-executable instructions cause the at least one processor further to:

after selection of one of the plurality of the candidate sensor poses to pose a first sensor based at least in part on the assessment of occlusion, for each of the plurality of candidate sensor poses, perform an occlusion assessment that accounts for an occlusive effect of at least a first robot in the operational environment as the first robot moves through each of a plurality of robot poses of the first robot; and select one of the plurality of the candidate sensor poses to pose a second sensor based at least in part on the assessment of occlusion.

22. The system of claim 21 wherein to perform an occlusion assessment, when executed, the processor-executable instructions cause the at least one processor further to: perform the occlusion assessment which also accounts for the first sensor positioned and oriented as specified by the selected one of the candidate sensor poses for the first sensor.

23. The system of claim 21 wherein the sensors are cameras, and wherein, when executed, the processor-executable instructions cause the at least one processor further to:

receive sensor information collected by a first one of the cameras in a first pose that corresponds to the selected sensor pose for the first sensor and from a second one of the cameras in a second pose that corresponds to the selected sensor pose for the second sensor; and perform motion planning for at least the first robot based on the received sensor information.

* * * * *